US007529796B2

(12) United States Patent
Riddle

(10) Patent No.: US 7,529,796 B2
(45) Date of Patent: May 5, 2009

(54) FILE SHARING USING NEAR REAL TIME MESSAGING

(75) Inventor: Guy Riddle, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/716,504

(22) Filed: Mar. 8, 2007

(65) Prior Publication Data

US 2007/0162589 A1    Jul. 12, 2007

Related U.S. Application Data

(60) Division of application No. 10/763,587, filed on Jan. 23, 2004, now Pat. No. 7,437,420, which is a continuation of application No. 08/646,500, filed on May 8, 1996, now Pat. No. 7,167,897.

(51) Int. Cl.
*G06F 15/16* (2006.01)

(52) U.S. Cl. .................. 709/204; 709/206; 709/227

(58) Field of Classification Search ........................ None
See application file for complete search history.

(56) References Cited

U.S. PATENT DOCUMENTS

| | | | |
|---|---|---|---|
| 4,882,743 A | 11/1989 | Mahmound | |
| 4,999,766 A * | 3/1991 | Peters et al. ................... | 707/10 |
| 5,455,854 A | 10/1995 | Dilts et al. | |
| 5,477,546 A | 12/1995 | Shibata et al. | |
| 5,544,300 A | 8/1996 | Skarbo et al. | |
| 5,550,754 A | 8/1996 | McNelley et al. | |
| 5,572,232 A | 11/1996 | Rhodes et al. | |
| 5,572,582 A | 11/1996 | Riddle et al. | |
| 5,600,646 A | 2/1997 | Polomski | |
| 5,606,554 A | 2/1997 | Shibata et al. | |
| 5,617,539 A | 4/1997 | Ludwig et al. | |
| 5,623,690 A | 4/1997 | Palmer et al. | |
| 5,649,105 A | 7/1997 | Aldred et al. | |
| 5,652,887 A | 7/1997 | Dewey et al. | |
| 5,689,641 A | 11/1997 | Ludwig et al. | |

(Continued)

FOREIGN PATENT DOCUMENTS

GB    2 289 149 A    *    8/1995

(Continued)

OTHER PUBLICATIONS

Judith S. Donath et al., The Social Web, Proceedings of Second International WWW Conference, 1994, 6 pages, retrieved from [http://www.nicoladoering.de/Hogrefe/donath.htm].*

(Continued)

*Primary Examiner*—Patrice Winder
(74) *Attorney, Agent, or Firm*—Blakely, Sokoloff, Taylor & Zafman LLP

(57) ABSTRACT

A system and method for providing file sharing using an instant messaging application are described herein. In one embodiment, a communication channel is established via an instant messaging application between a local device and a remote device over a network. In a file sharing window on the local device a representation of a file stored in the remote device is displayed. The file sharing window is associated with the instant messaging application and the file sharing window enables the local device to access the file stored in the remote device via the communication channel of the instant messaging application.

38 Claims, 20 Drawing Sheets

U.S. PATENT DOCUMENTS

| | | | |
|---|---|---|---|
| 5,710,591 | A | 1/1998 | Bruno et al. |
| 5,724,508 | A | 3/1998 | Harple, Jr. et al. |
| 5,760,769 | A | 6/1998 | Petrie |
| 5,764,915 | A | 6/1998 | Heimsoth et al. |
| 5,793,365 | A * | 8/1998 | Tang et al. .................. 715/758 |
| 5,799,151 | A | 8/1998 | Hoffer |
| 5,801,700 | A * | 9/1998 | Ferguson .................... 715/748 |
| 5,841,763 | A | 11/1998 | Leondires et al. |
| 5,848,143 | A | 12/1998 | Andrews et al. |
| 5,857,189 | A | 1/1999 | Riddle |
| 5,872,923 | A | 2/1999 | Schwartz et al. |
| 5,903,754 | A | 5/1999 | Pearson |
| 5,907,324 | A | 5/1999 | Larson et al. |
| 5,933,597 | A | 8/1999 | Hogan |
| 6,008,806 | A | 12/1999 | Nakajima et al. |

OTHER PUBLICATIONS

Jarkko Oikarinen et al., Request for Comments (RFC) 1459: Interent Relay Chat Protocol, Internet Engineering Task Force, May 1993, 65 pages.*

Levendel, Y. "Software Assembly Workbench: How to Construct Software Like Hardware," IEEE, pp. 4-12 (Feb. 1995).

Apple Computer, Inc., Apple Media Conference Guide.

Apple Computer, Inc., Apple QuickTime Conferencing Kit, Aug. 1995.

Apple Computer, Inc., *Apple QuickTime Conferencing*, Apple QuickTime Fact Sheet, Jan. 1995.

Shinjo, et al., *Object-Stacking in the World-Wide Web*, Fourth International Workshop on Object-Orientation in Operating Systems, IEEE, pp. 210-219.

Shinjo, Yasushi, *The Object-Stacking Model for Structuring Object-Based Systems*, International Workshop on Object-Orientation in Operating Systems (I-Woods '92), Sep. 24-25, 1992.

* cited by examiner

FILE SHARING USING NEAR REAL TIME MESSAGING

This application is a Divisional of U.S. patent application Ser. No. 10/763,587, filed Jan. 23, 2004 (now issued as U.S. Pat. No. 7,437,420), which is a continuation of U.S. patent application Ser. No. 08/646,500, filed May 8, 1996 (now issued as U.S. Pat. No. 7,167,897). The disclosure of the above identified applications is incorporated herein in its entirety.

FIELD OF THE INVENTION

The present invention relates to teleconferencing systems. More specifically, the invention relates to accessories for a teleconference component.

BACKGROUND INFORMATION

Teleconferencing is increasingly becoming a popular application in personal computer systems. Such applications typically allow the transfer of audio and video data between users so that they can speak and otherwise communicate with one another. Such applications sometimes also include data sharing wherein various types of data such as documents, spreadsheets, graphic data, or other types of data, can be shared and manipulated by all participants in the teleconference. Different teleconference applications perhaps residing on different hardware platforms have different capabilities. Moreover, a wide variety of features has been implemented in different teleconference applications, and the proliferation of different types of computer systems with different capacities, and different networking media has created challenges for teleconferencing.

For example, for most teleconferencing applications, it is assumed that the sender and the receiver have certain minimum capabilities. However, with the wide diversity of systems having different computation capacities, and in addition, the wide variety of networking media, that certain systems may not have certain capabilities. Prior art systems have typically required that the application provide support for all capabilities used within the teleconference. This fact has substantially complicated teleconferencing applications, and made expansion of capabilities difficult or impossible. It would be desirable to be able to relieve the application of the burden of supporting all capabilities by providing accessories which interface logically between the application and a base teleconference component to provide additional and expandable capabilities.

SUMMARY OF THE INVENTION

A system and method for providing file sharing using an instant messaging application are described herein. In one embodiment, a communication channel is established via an instant messaging application between a local device and a remote device over a network. In a file sharing window on the local device a representation of a file stored in the remote device is displayed. The file sharing window is associated with the instant messaging application and the file sharing window enables the local device to access the file stored in the remote device via the communication channel of the instant messaging application.

DESCRIPTION OF THE DRAWINGS

The present invention is illustrated by way of example and not limitation in the figures of the accompanying in which like references indicate similar elements and in which.

DETAILED DESCRIPTION

The present invention relates to teleconferencing systems, more specifically, the present invention describes systems in which accessories are employed to increase the functionality of the teleconference independent of a teleconferencing application employed. Although the present invention will be described with reference to certain specific embodiments thereof, especially, with relation to certain hardware configurations, data structures, packets, method steps, and other specific details, these should not be viewed as limiting the present invention. Various modifications and other may be made by one skilled in the art, without departing from the overall spirit and scope of the present invention.

A portion of the disclosure of this patent document contains material which is subject to copyright protection. They copyright owner has no objection to the facsimile reproduction by anyone of the patent disclosure, as it appears in the Patent and Trademark Office patent files or records, but otherwise reserves all copyright rights whatsoever. Copyright Apple Computer, Inc.

Figure 1:
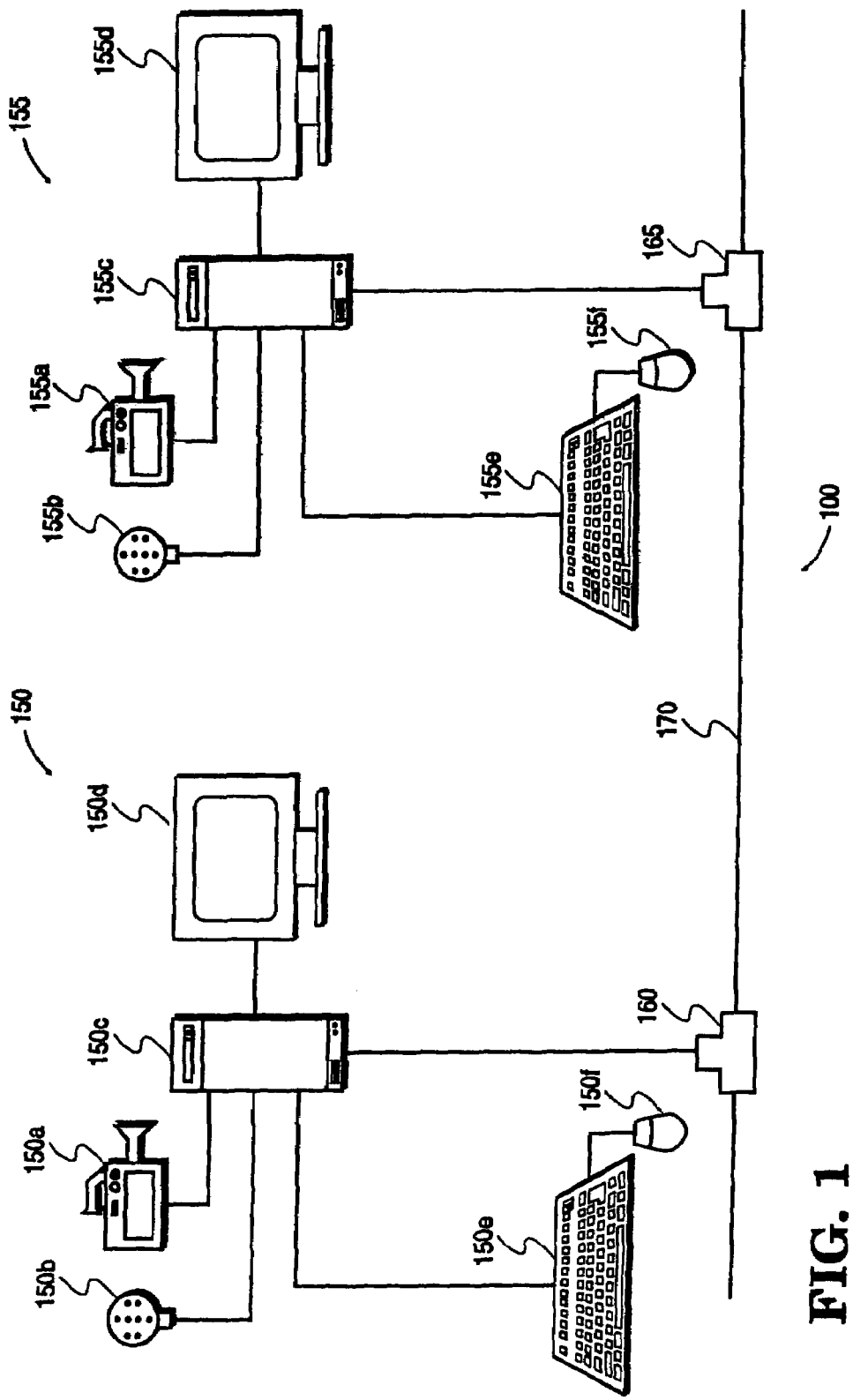
FIG. 1 illustrates an example configuration in which various embodiments of the present invention may be implemented.

A typical system configuration in which a teleconference may take place is illustrated as 100 in FIG. 1. For example, a first workstation 150 may communicate via teleconference with a second workstation 155, as illustrated. System 150 may include a central processing unit 150c which is coupled to a display 150d a video input device 150a, and a sound input device 150b. The system 150 may communicate with system 155 over networking medium 170 via network connection module 160. Network connection module 160 may include any number of network adapters commercially available such as using Ethernet, Token Ring, or any other networking standard commercially available. Note that network connection module 160 may also include a wireless network adapter which allows transmission of data between components without a medium 170. Communication is thus provided via network adapter 165 coupled to system 155, and bi-directional communications may be established between two systems. System 150 further has a keyboard 150e and a pointing device 150f, such as a mouse, track ball, or other device for allowing user selections and user input.

Figure 2:
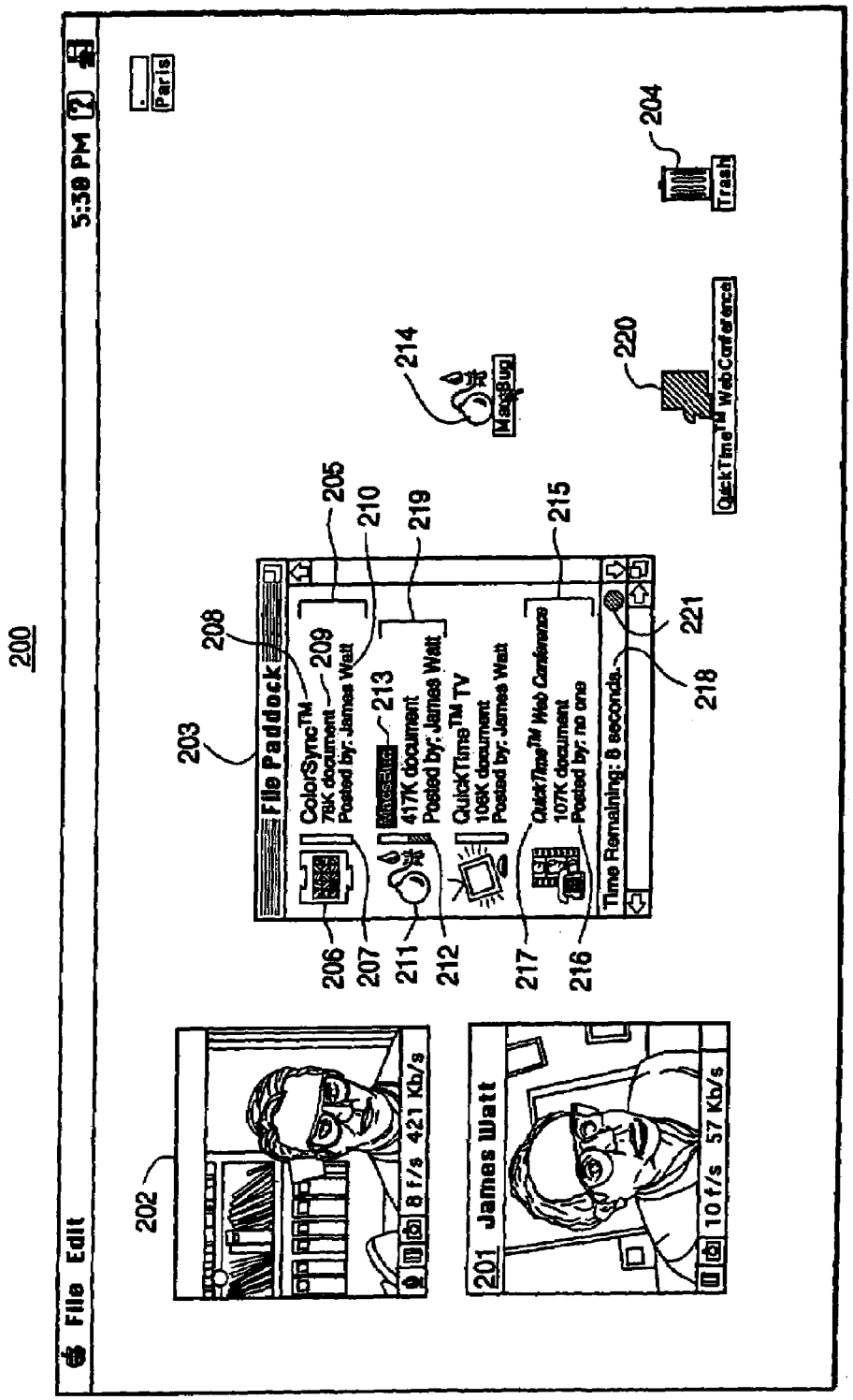
FIG. 2 shows a teleconference display of one embodiment of the invention.

FIG. 2 shows a teleconference display 200 on which icon 220 corresponds to the conferencing application in use. In implemented embodiments of the present invention, there is a source window, such as 202, showing a monitor of the local media source, and there are other media windows, such as 201 for each other member with which a local member is communicating. While only one other media window is shown, it is anticipated that several members (and accordingly several other media windows) may participate in any teleconference. In the illustrated example, each of the windows 201-202 provides media information, that is, real-time audio and/or video information for bi-directional teleconferencing. Accessory window 203 is an example of an accessory window for one possible accessory of the instant invention. Only a single accessory window 203 is shown, however it is envisioned that up to n (where n is an arbitrarily large number) accessories could be used. Each accessory either has an associated accessory window or is a faceless accessory. This distinction will be discussed further below.

The particular accessory shown is a file sharing accessory which allows advertisements 205 to be posted by a user at a remote endpoint and viewed by a user at a local endpoint within the accessory window 203. Similarly, the local user can post advertisements 215 in the accessory window 203 that can then be viewed by a remote user. The advertisement 205 includes an icon 206, a file name 208, a file size and type 209, and the name of the remote member 210 responsible for the posting. A copy bar 207 is also provided.

To copy a file associated with an advertisement, the local member need only drag the icon 206, 211 to a location to which copying is desired, and the accessory will copy the file to that location. Here, icon 211 has been dragged to the desktop where the icon 214 appears. The copy bar 212 begins to fill as the copying from a remote endpoint is performed. The file name 213 is highlighted when selected. An advertisement need not remain selected during copying. Once copying is complete, the file name 213 will revert from boldface type to plain text. The time remaining 218 to complete copying is displayed in the lower part of the accessory window 203. Clicking on stop sign 221 while copying of a selected file is in progress will abort the copy and cause the partially copied file to be deleted. If no file is selected, the stop sign option is unavailable. In one embodiment, once a file has been copied, the advertisement effectively becomes an alias allowing the file to be launched by double clicking on the advertisement. Significantly, prior to copying, said double clicking will only result in a dialog box indicating that the file must be copied to be launched. This is because no physical file exists on the local end point and the advertisement merely provides an access path through which the physical file may be copied.

A locally posted advertisement 215 differs from a remotely posted advertisement in that the file name 217 is displayed in italic type and instead of a poster's name, the copy status 216 is displayed. In one embodiment, copying locally posted files is not permitted. As other members of the conference copy the file associated with advertisement 215, the copy status will change to reflect "copied by everyone" or copied by x of n where x is the number of copiers, and n is the number of conference members. At any time, a member may delete an advertisement in the accessory window 203 by dragging the corresponding icon to the trash 204. If the deleting member is also the posting member for the advertisement, once trashed, the advertisement will disappear from all conference members' windows. Conversely, if a remotely posted advertisement is trashed, it is only deleted from the trasher's file sharing window.

Figure 3:
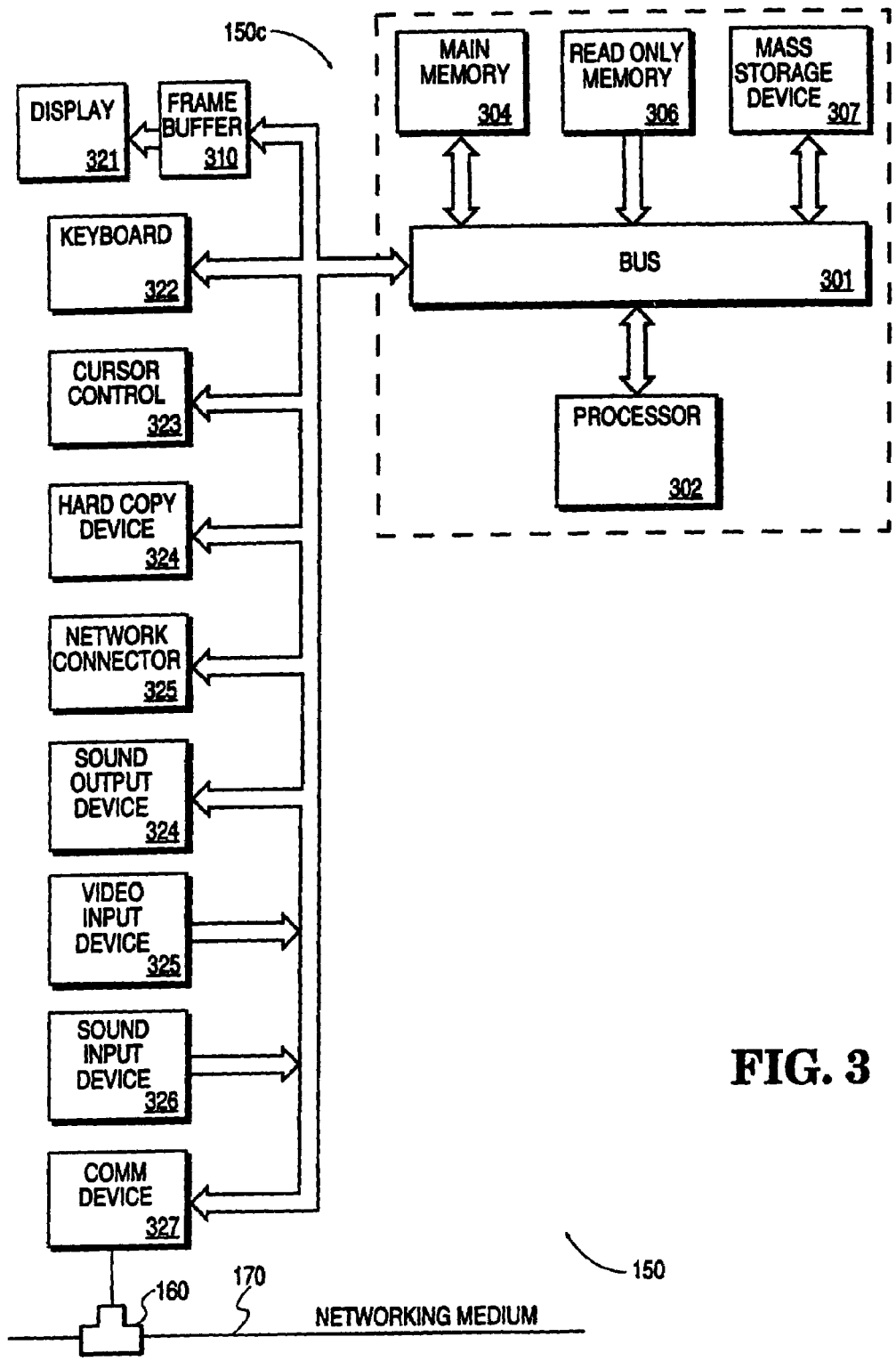
FIG. 3 shows a single system in which embodiments of the present invention may be implemented.

A computer system, such as a workstation, personal computer or other processing apparatus 150c or 155c as shown in FIG. 1 is illustrated in more detail in FIG. 3. 150c comprises a bus or other communication means 301 for communicating information, and a processing means 302 coupled with bus 301 for processing information. System 150c further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. Included in memory 304 during run-time may be the conference component module which operates according to the communication protocols generally known in the art. System 150c also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions.

System 150c may further be coupled to a display device adapter 321 such as a cathode ray tube (CRT) or liquid crystal display (LCD) coupled to bus 301 for displaying information to a computer user. Such a display 321 may further be coupled to bus 301 for the receipt of video or image information. An alphanumeric input device 322, including alphanumeric and other keys may also be coupled to bus 301 for communicating information and command selections to processor 302. An additional user input device is cursor control 323, such as a mouse, a trackball, stylus, or cursor direction keys, coupled to bus 301 for communicating direction information and command selections to processor 302, and for controlling cursor movement on display 321. For teleconferencing applications, system 150c may also have coupled to it a sound output device 324, a video input device 325, and sound input device 326, along with the associated D/A (Digital-to-Analog) and A/D (Analog-to-Digital) converters for inputting or outputting media signal bitstreams. System 150c may further be coupled to communication device 327 which is coupled to network adapter 160 for communicating with other teleconferencing stations.

Note, also, that any or all of the components of system 150c and associated hardware may be used in various embodiments, however, it can be appreciated that any configuration of the system may be used for various purposes according to the particular implementation.

In one embodiment, system 150c is one of the Apple Computer® brand family of personal computers such as the Macintosh 8100 brand personal computer manufactured by Apple Computer, Inc. of Cupertino, Calif. Processor 302 may be one of the PowerPC brand microprocessors manufactured by Motorola, Inc. of Schaumburg, Ill.

Note that the following discussion of various embodiments discussed herein will refer specifically to a series of routines which are generated in a high-level programming language (e.g., the C or C++ programming language) and compiled, linked, and then run as object code in system 150c during run-time within main memory 304 by processor 302. For example the object code may be generated by the C++ Compiler available from Symantec, Inc. of Cupertino, Calif.

Although a general purpose computer system has been described, it can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
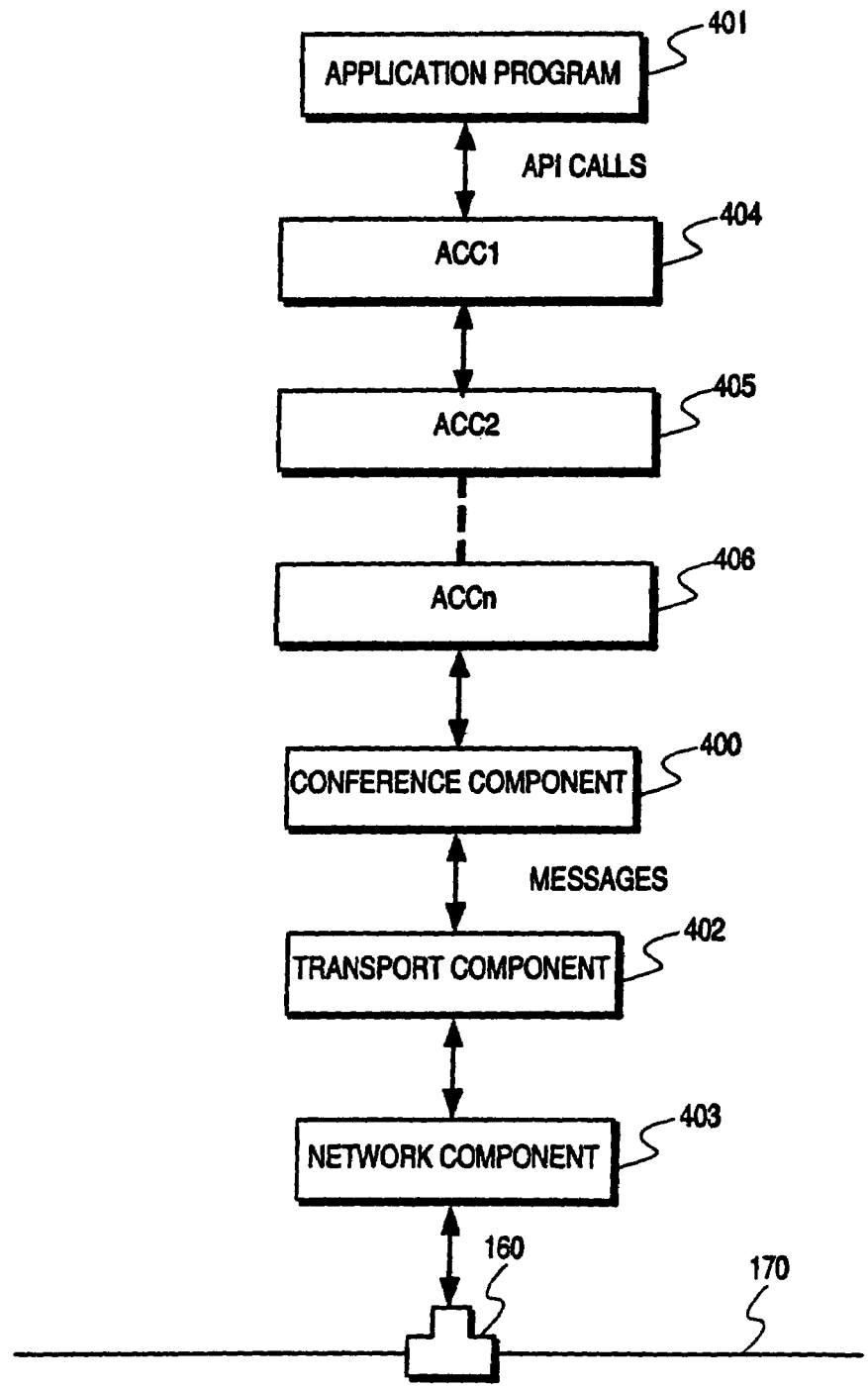
FIG. 4 shows an example architecture of a system employing various embodiments of the present invention.

FIG. 4 illustrates a plurality of processes and/or apparatus which may be operative within system 150c. At the highest level, for example, at the highest level in the ISO/OSI networking model, an application program 401, such as a teleconferencing application, an audio/video server, or a data server, communicates with conference accessory 404 in the form of Application Program Interface (API) calls. Each accessory 404-406 is a derived component which adds some additional capability to the conference component 400. An accessory 404 receives the API calls from the application 401 and events from conference component 406 (indirectly via accessories 405 and 406). An accessory claims API calls and events directed to it, and forwards those not directed to it. In this way, all events intended for the application 401 are passed along through the accessories to the application 401. Similarly, API calls for the conference component are passed to the conference component through the accessory stack. Because the application interfaces with only a single accessory, overhead and complexity of the application are reduced over a system in which an application interfaces in parallel with n accessories.

Figure 4A:
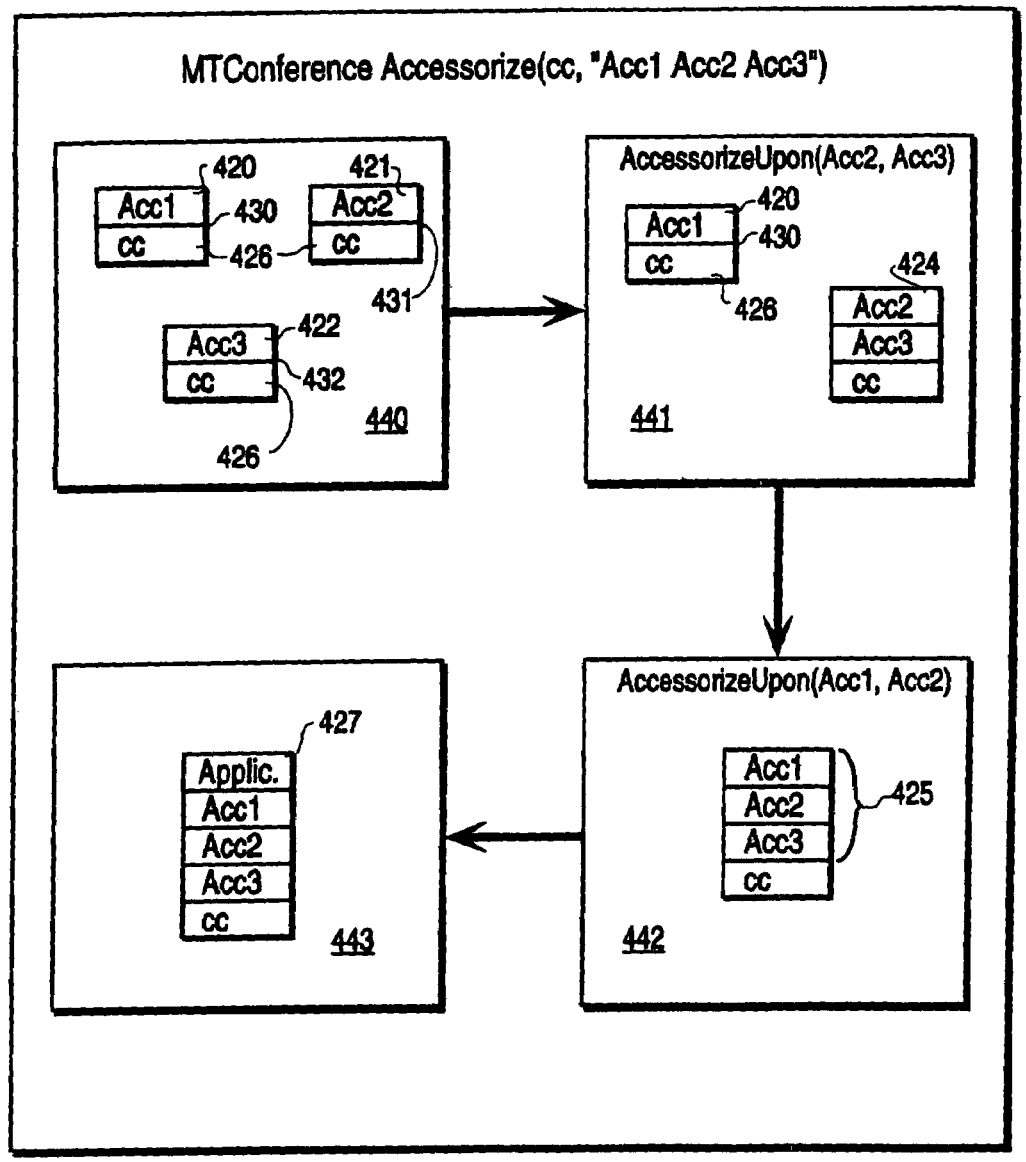
FIG. 4a shows stacking of accessories using an API call.

FIG. 4a shows operation of the API call used to create an accessory stack. The API call MTConferenceAccessorize( ) accepts one of two forms of arguments: 1) an accessory string listing the desired accessories in the desired order from top to bottom of the stack; or 2) all automatic accessories which will stack all automatic accessories in an arbitrary order. As previously discussed, accessories are derived components including a conference component 426 and a capability component 420, 421 and 422 as shown in frame 440. These capability components and conference components make up derived components 430, 431 and 432. When an application wishes to stack accessories it is necessary to sever the conference component from all but the bottom accessory in the stack. This is performed within the accessorized API call by calling MTConferenceAccessorizeUpon( ) which unglues, for example, capability component 421 of derived component 431, and reattaches it to derived component 432 to form new derived component 424 as shown in frame 441. By iteratively calling MTConferenceAccessorizeUpon( ) accessory stack 425 is created. The top of the stack is then linked to the application as shown in frame 443. In this way the capabilities of the accessories are accumulated serially between the application and the conference component. Thus, the API calls and events are passed through the accessory stack with each accessory watching for events and calls relevant to it. If the event or the call is relevant to the accessory the accessory will take some action. If it is not relevant to the accessory, the accessory merely passes it along to the next level of the stack until it reaches either the application or the conference component depending on which direction the message is flowing.

Because the accessory provides its capability to the teleconference system while remaining independent of the application, an application with only minimal teleconference capability may appear to the user to be quite robust simply by accessorizing a number of accessories. The accessories are transparent to the application and are typically stored on the system heap in memory. In the case of automatic accessories, the application need not know of the existence or capability of the accessory. The application merely issues API calls as it would in the prior art and the accessories take care of themselves. Such accessories will forward events (including events related to the accessory) to the application but the application can ignore unfamiliar events without detriment. If the application "knows" about the accessories, such events may be used, e.g. to update menus or status information. Accessories are generally independent of the transport protocol used and do not deal with the real time media.

Accessories fall within two classes, accessories associated with a window and faceless accessories. Many window associated accessories are used for relatively low bandwidth sharing functions including but not limited to, file sharing, shared whiteboard, chat window, application sharing and desk top sharing. File sharing allows members of a teleconference to share files by placing those files in the associated accessory window. Application sharing would allow members to share a running application. For example, a word processing document may be shared such that all members can edit the document during the conference. A shared white board accessory would create a window in which graphics and text can be shared between members. Desk top sharing allows the teleconference members to access and use items residing on remote members' desk tops. A chat window could be used as a low bandwidth replacement for the audio/visual media of the teleconference allowing near real-time sharing of typed messages.

To remain independent of the application, the window associated accessories take advantage of certain features of the operating system and the MovieTalk Toolbox. Specifically, the accessory must be able to identify system events that apply to it before the application receives the event. Each accessory makes a call to MTToolboxPreviewSystemEvent( ). Upon receiving a system event, the MovieTalk Toolbox passes it to each accessory which has made this call until an accessory claims the event or all such accessories have failed to claim this event. For example, a mouse down event may be passed to an accessory which determines if the mouse down occurred in its window. In this way, user interaction is handled transparently to the application. In one embodiment corresponding windows on a remote end point of some or all of the windows associated accessories automatically reflect changes, e.g., typing, cutting, pasting, posting, etc., to the local window. Simultaneously, the local window will automatically "share" remote changes. Thus, corresponding representations will appear in both the local and remote windows associated with a particular accessory.

Other window associated accessories perform other types of functions, such as window mirroring. Window mirroring associates events within some window of interest with the real-time media events and converts those window occurrences into a video stream. This might be particularly useful in the context of a lecture with, for example, changing slides. In such case, it is desirable that the slide be associated with the audio and video at the proper time in the lecture. By placing the slides in a window subject to window mirroring, the slide will be so associated and converted to a video stream receivable by the teleconference members. A movie of the teleconference could subsequently be played back and the audio, video and the slides in the movie would be correctly associated.

Faceless accessories have no associated window but nevertheless provide some useful capability. Examples of faceless accessories include call logging, data compression, encryption, and protocol translation. Call logging can be used even where no other member has that capability. It might, for example, track the number of calls placed and received, to whom, and the disposition or length of the calls. Faceless accessory have no direct user interaction. Rather, they remain independent of the application by monitoring messages moving through the accessory stack and taking action according to the messages. While in most cases the ordering of window associated accessories in the accessory stack can be arbitrary, faceless accessories need to be at the bottom of the stack (e.g., closer to the conference component). Moreover, within a group of faceless accessories, specific ordering is desirable. For example, data compression should be performed before encryption. Moreover, the ordering must be the same at both end points (e.g., so that decryption occurs before decompression at the remote endpoint). Also significant is the fact that accessories communicate through a point to point link rather than through a multicast. This allows accessories to be used between any two conference members even if other members do not have that accessory capability. For example, in a three-way teleconference in which only two members have data compression. The two having data compression can communicate in compressed messages while not compressing the messages sent over the links to the third member.

The conference component 400 allows the application 401 to establish communications between two or more teleconference stations. Control information, and media information can be transmitted between the first participant system and a second participant system. The conference component will be shown in more detail in FIG. 5. Conference component 400 communicates with the transport component 402 by sending MovieTalk messages for other teleconferencing stations which are encapsulated and placed into a form that the transport component 402, the network component 403, and the system network component 404 can packetize and transmit over networking medium 170. For the purposes of the remainder of this disclosure, certain of the API calls and messages which are transmitted between conference components in a teleconferencing system will be described in more detail.

The transport component 402 and the networking component 403 provide the necessary operations for communication over the particular type of network adapter 160 and networking medium 170 according to implementation. For example, networking component 402 may provide the TCP or ADSP protocols and packetizing, according to those respective standards.

Figure 5:
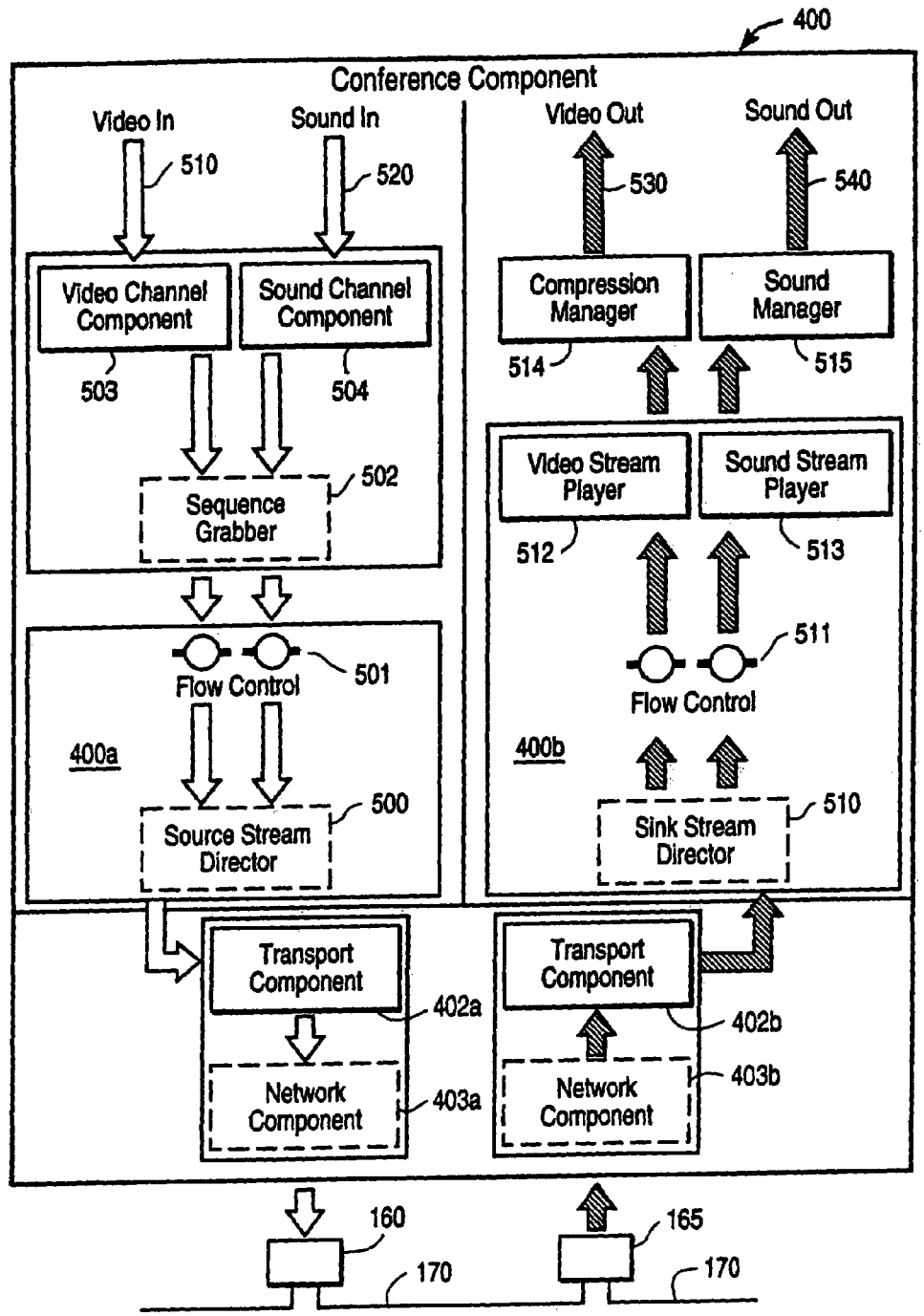
FIG. 5 shows a more detailed view of the conference component illustrated in FIG. 4.

FIG. 5 shows a more detailed view of the conference component 400. Specifically, the conference component 400 is shown in two portions 400a and 400b which show input and output portions of the conference component. Although illustrated as a separate transmitter and receiver, each conference component in the system has both capabilities, so that full bi-directional communication between conference components in respective participant teleconference systems in a network may communicate with one another. As illustrated, the input portion of the conference component 400a receives video and sound information over media input channels 510 and 520. The video channel component and sound channel component 504 present media data at regular intervals to sequence grabber 502. The real-time sound and video data (hereinafter referred to as "media data") are provided to a source stream director 500 from sequence grabber 502 which then provides the media messages to the transport component 402. Flow Control 501 then lets the video and sound data flow through at an implementation-dependent frequency. The video channel component 503, sound channel component 504, and sequence grabber 502 all are implemented using prior art products such as those commercially available (e.g., the QuickTime video channel, sound channel components, and sequence grabbers, available from Apple Computer, Inc. of Cupertino, Calif.) Flow control 501 may be implemented using known flow control apparatus and/or method as are commercially available, such as those which regulate flow based upon bandwidth, and other constraints in the source participant system. The conference component further comprises a sink stream director 510 which comprises a portion of the component 400b of the conference component for receipt of media data from transport component 402. Corresponding flow control 511, video and sound stream players 512 and 513, and compression and sound manager 514 and 515, for output of video streams 530 and 540, also form part of the conference component for full bi-directional conferencing capabilities.

The conference component's main function is to establish and maintain a bi-directional connection between every member of a conference. Conferencing applications use a pre-established control channel to exchange control data that is pertinent to the conference. This data might include user identification information or other information that is germane to the application's operation. Conferencing applications (e.g., 401) define the format and content of these control messages by establishing their own control protocols. The conferencing component further establishes communication channels between a first endpoint and a second endpoint, using the underlying transport component 402. Thus, once a media channel has been established, the conference component uses the transport component 402's media channel which is provided for transmission of media and non-media information.

Application Program Interface (API)

The application program 401 controls the accessories and conference component 400 by the issuance of API calls. The conference component operates using an event-driven model wherein events are passed serially through the accessories. If the event is pertinent to the accessory, the accessory may consume the event. Otherwise, it is passed through each accessory until it reaches the application. The application (or accessory) can then take appropriate action either by modifying internal local data structures and/or issuance of appropriate messages over the network to other connected participants, or potential participants. According to messages received by the conference component, a current context and API calls from the application, the conference component can take appropriate action. Two API calls which are particularly applicable to an accessory environment are MTConferenceGetError( ) and MTConferenceSetScrapSynchronizationProc( ). When a certain error occurs, the application may then make the MTConferenceGetError( ) API call to determine the actual cause of the error. GetError API call will return the cause of the error and then clear the error. Such errors are, for example, when an accessory tries and is unable to create its window. The GetError call may then return an error code indicating e.g. insufficient memory. The Scrap Synchronization call handles the case where editing (e.g., cutting and pasting) is performed in the accessory windows. If the application maintains a private copy of the scrap, the Scrap Synchronization must be used to ensure consistency during operations involving the scrap. To ensure the correct operation, the application must update the system scrap since moving between the accessory windows will not generally cause an update as would be the case of moving between applications. Thus, this call forces an update of system scrap. Other API calls relevant to accessories are discussed below.

Figure 6:
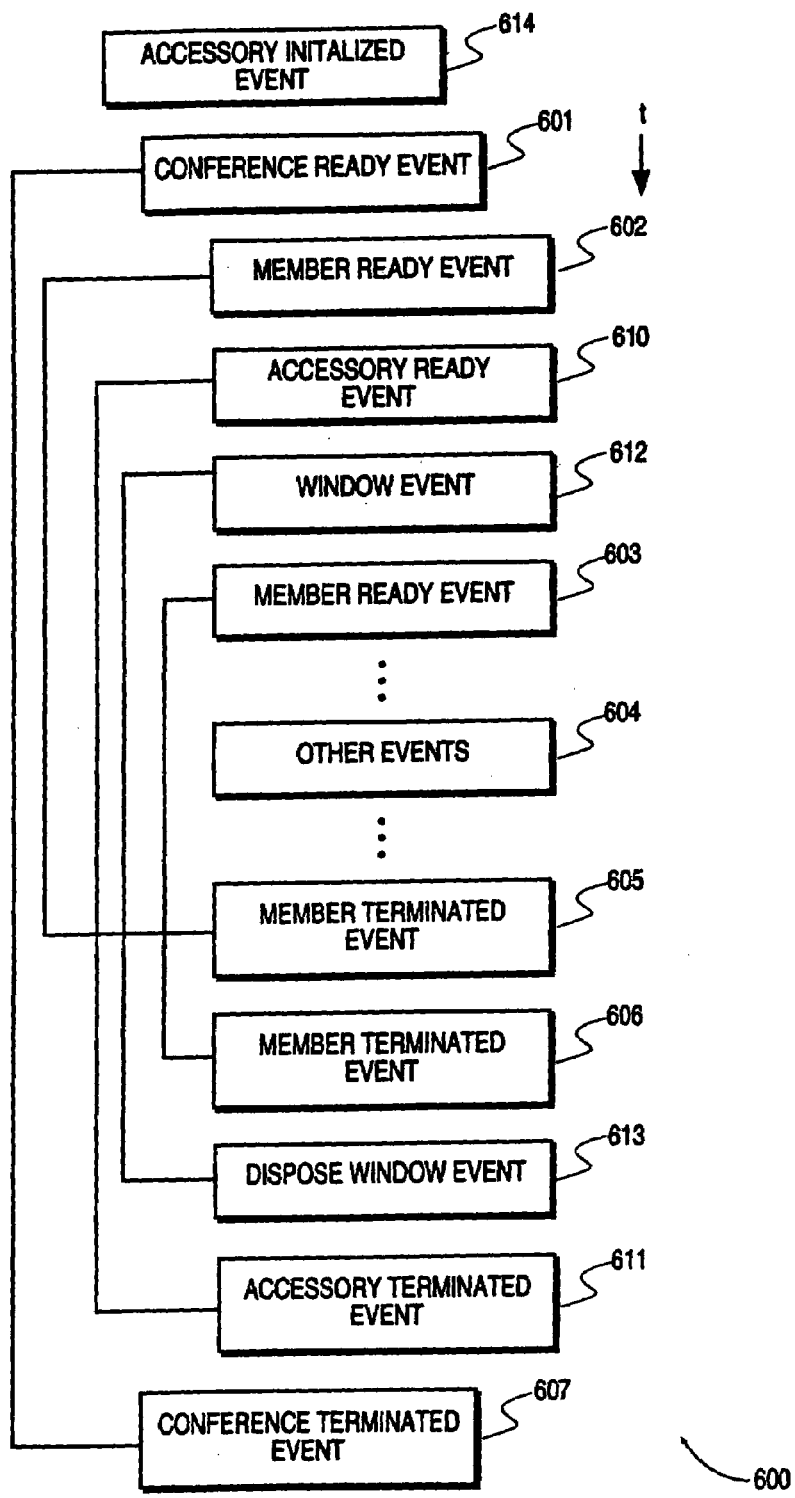
FIG. 6 shows a sequence of typical conference events during a teleconference which are forwarded through an accessory stack to an application.

FIG. 6 shows one typical series of events 600 which occur in an application during teleconference established by the conference component. For the sake of illustration, a single accessory is presumed to exist (e.g., file sharing). Prior to placing or listening for calls, the accessory must be initialized as discussed above. Completion of the MTConferenceAccessorize( ) API call will yield an AccessoryInitialized event 614. A ConferenceReady event 601 is generated when a call is accepted. The application then creates a media source in the conference component (e.g., member A) which is to provide the conference information. Then, any members that are new to the conference are recognized as being ready by the receipt of MemberReady events (e.g., 602 and 603 of FIG. 6). The MemberReady event 602 or 603 will be followed by an AccessoryReady event 610 following the first MemberReady event from a member having file sharing capability. If file sharing is an automatic accessory, the AccessoryReady event 610 will be followed by a Window Event corresponding to the accessory's creation of a window on the display.

Then, during the teleconference session, a variety of other events 604 may be issued and acted upon by the conference component. These may include message events, mode events, incoming call events, data transmission events, etc.

Members leaving the conference result in the issuance of MemberTerminated events 605, 606 to the application program. Thus, for every MemberReady event for any member participating in a conference, there is a corresponding MemberTerminated event prior to the end of the conference. After the last member supporting, e.g., file sharing issues a MemberTerminated event, a Dispose Window event 613 is issued followed by an Accessory Terminated. The conference terminated event 607 signals the end of the conference illustrated in 600 and that teleconference data should no longer be transmitted. Any additional clean up operations are then performed by the application, and the source may be discarded.

Significantly, the accessory only exists within the context of a teleconference. It is, therefore, subject to such limitations accepting a call, if the call is not accepted which implies no ConferenceReady event 601, the accessory never comes on line. In, for example, file sharing, this prevents unauthorized access to files on a remote end point. Unlike the Unix protocol FTP in which a daemon always exists, and it is only an issue of finding the password to gain complete access to the remote files, the accessory only provides access to files explicitly posted and does not provide a facility for requesting files not posted. Moreover, it does not allow files to be placed on a local endpoint by a remote member, only the local member may make copy decisions for the local end point.

Figure 6A:
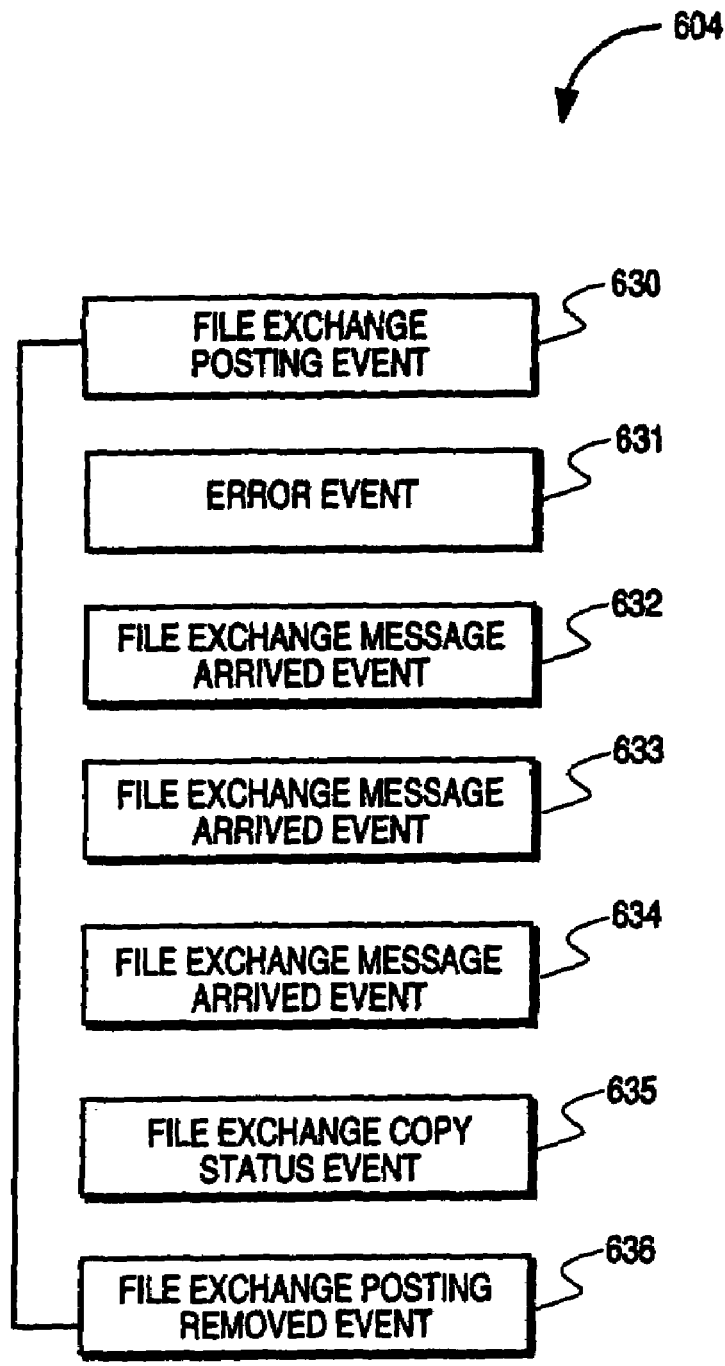
FIG. 6a shows one example of Other Events 604 passing through a file sharing accessory.

FIG. 6a shows one example of Other Events 604 passing through a file sharing accessory. FIG. 6a shows a group of other events 604 which might occur in a system having file sharing accessory. File exchange PostingAdded event 630 corresponds to the addition of an advertisement to the file sharing window. Error event 631 might be received as a result of any error occurring in the system.

FileExchangeMessageArrived events 632-634 correspond to the arrival of various messages between the file exchange accessories at the local and remote end point. Such messages may include data corresponding to a file being copied, a MorePlease message, or any other message sent between the file sharing accessory of a local and remote end point as discussed further below. File exchange copy status event 635 corresponds to a change in the copy status of the file being advertised. Copy status changes when the file is copied by a member or when a member joins or leaves the conference. Finally, file exchange PostingRemove event 636 corresponds to the removal of the advertisement posted which generated PostingAdded event 630. It should be recognized that this is only one example of a possible series of events 604 and innumerable other possible sequences exist.

Figure 7:
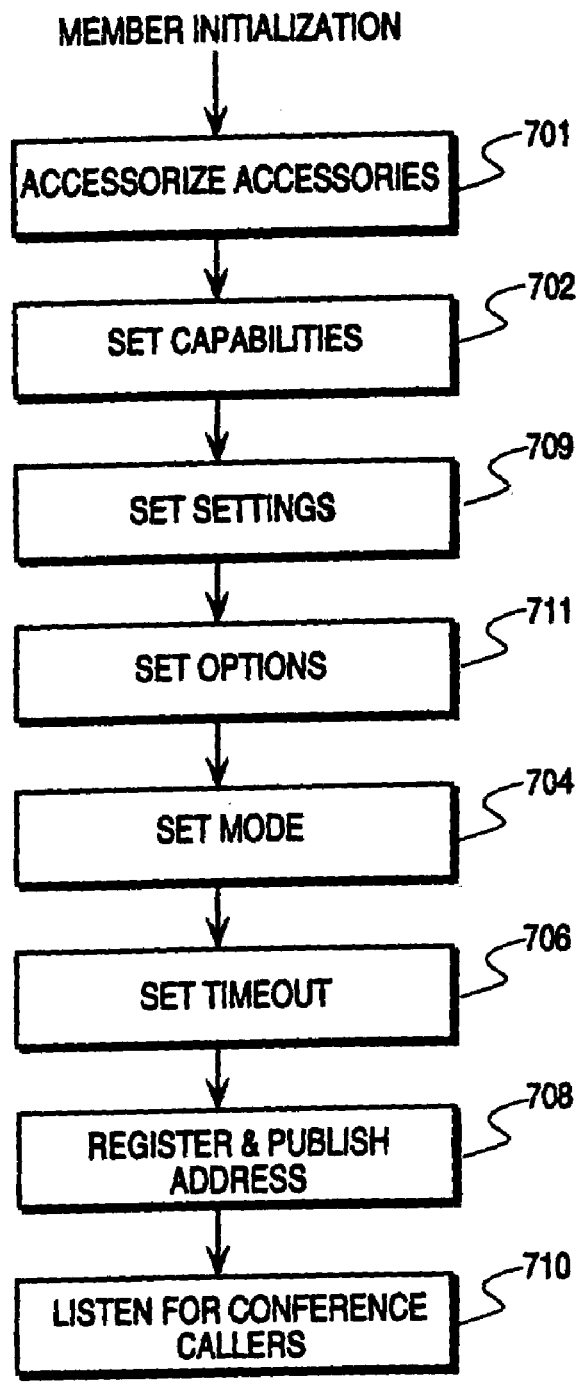
FIG. 7 shows a typical sequence of steps performed for member initialization before a teleconference.

A typical application's initialization is shown as process 700 of FIG. 7. The application program makes a number of API calls in order to set various parameters associated with the member or potential participant. First, an application may cause the conference component to set its capability at step 702 if it is different than the default. The call to "MTConferenceSetMessageCapabilities" causes the conference component to recall and store the capabilities of the application and all intervening accessories within the conference component which are later used during transmission of messages to alert recipients that the sender system has certain functional capabilities prior to the establishment of a connection between the sender and the receiver. Each accessory adds its capabilities to the arguments of the API call before passing it along.

Each capability has associated with it a type, version, and "desire" of the capability. Each desire for each capability type may be flagged as:

1. optional;
2. desired;
3. required;
4. accessory; or
5. a negotiation message.

These types of capabilities are included in a capabilities list which is transmitted to endpoints, as will be described below. An "optional" capability is a message which is not required to be exchanged before setting up a conference. A "desired" capability is one which is not required that it be exchanged before setting up a conference, however, it is preferred that it is. A "required" capability is one which requires that a message be exchanged before setting up a conference. This may include access control or other messages which are transferred prior to setting up a conference. An access control capability may include the transmission of a account number and password prior to the commencement of a teleconference. An "accessory" capability is provided by an accessory that has been accessorized. If a corresponding accessory exists in a remote member, the capability will be employed. A "negotiation message" is a capability which indicates that the application wishes to query the receiving application regarding installed hardware or software functionality information about the applications prior to the establishment of a conference. Any other types of exchanges which require negotiated information between applications may be set.

Once all individual capabilities have been set by the issuance of "Set Capabilities" API calls to the conference component at step 702. The application may restore previously saved setting 709 by calling 'MTConferenceSetSettings'. 'MTConferenceSetAccessoryOptions' can be called to set the accessory options discussed below in connection with FIG. 8. Then a member may set its operating mode at step 704. The mode will be contained within a mode mask value which is sent in the API call to the conference component, and moreover, is included in certain messages transmitted from the conference component in the sender to the conference component in the receiver. The mode mask specifies the characteristics of a conference that the member makes available. Different capabilities, modes, and other initialization values shown in FIG. 7 may be set for any number of conference types which are made available by the member. At any rate, the default mode includes the following values:

1. send media;
2. receive media;
3. shareable; and
4. joiner.

The "send media" mode flag indicates that the member intends to send media data in its conferences. Most members will want to send media, however, there will be instances where the member will be a receive-only member, thus the send media mode flag will not be set. The receive media mode flag indicates that the member intends to receive media in conferences. In the case of a send-only member (e.g., a server providing a real-time video and/or audio source), will have the receive media mode flag set to "off" (e.g., a numeric value '0'). The "shareable" mode flag indicates that the member is willing to share the conference media data with new conference members. Thus, in the instance of a send-only media server, the shareable mode flag would be set indicating that new members can receive the conference data.

The "joiner" mode flag indicates that all conference members are allowed to interact. This would allow two-way transmission between each of the conference members. However, the setting of this flag to "off" (e.g., a numeric value '0') results in broadcast type conferences wherein one member sends media data to other conference members, but the individual conference members do not exchange any media data among themselves. Each of these mode flags is transmitted at the beginning of a connection (e.g., contained within the "hello" message 1400 in FIG. 14).

By default, the conference component establishes conferences that are fully two-way media data capable, shareable, and joinable. If different characteristics are desired, then the application must call "set mode" at step 704, along with the appropriate flag(s) set. Conference mode settings are stored and associated with a particular conference ID in the sender's conference component so that when messages are created for that conference ID, the appropriate mode flags are transmitted along with the initialization or other messages sent before any other communications.

In addition to the capabilities and mode settings at steps 702 and 704, a time-out value associated with calls placed from the member may be set. The time-out value is then included at the beginning of certain messages preceding a conference in order to enable a recipient to determine when the caller will stop listening for responses. This allows certain features to be incorporated into participant conference components such as the smart triggering of events based upon context. For example, if the recipient is receiving a call, but a user does not wish to take the call at that time, the recipient's conference knows the time-out occurs and can take certain context-dependent action (e.g., forward the call, send a message, etc.).

The application can then invoke an API call "Listen for Call" which implements steps 708 and 710. At step 708, using the underlying transport to which the system is connected, a high level address is registered and published. This then allows other potential participants in the system to call the member. The registration and publication of the address is implementation-dependent, depending upon the media to which the system is connected. Then, at step 710, the conference component waits for incoming calls. p The conference component in the member enters an idle state wherein incoming messages, alerts for the transport component, API and calls will be detected and acted upon. Note that the capabilities, mode, and time-out values are all optional, and the default settings may be used by the member if none of these functions is required by the application. In the call to the MTConferenceListen function, the application must specify the networks on which the member is willing to accept calls. The conference component proceeds to register the member on those networks, doing whatever is appropriate in the various network contexts, and sends an MTListenerStatus event to the application to specify whether the registration attempt was successful. After listeners are operational, if another application desires to establish communication with the application, then an MTIncomingCallEvent is forwarded to the application.

Figure 8:
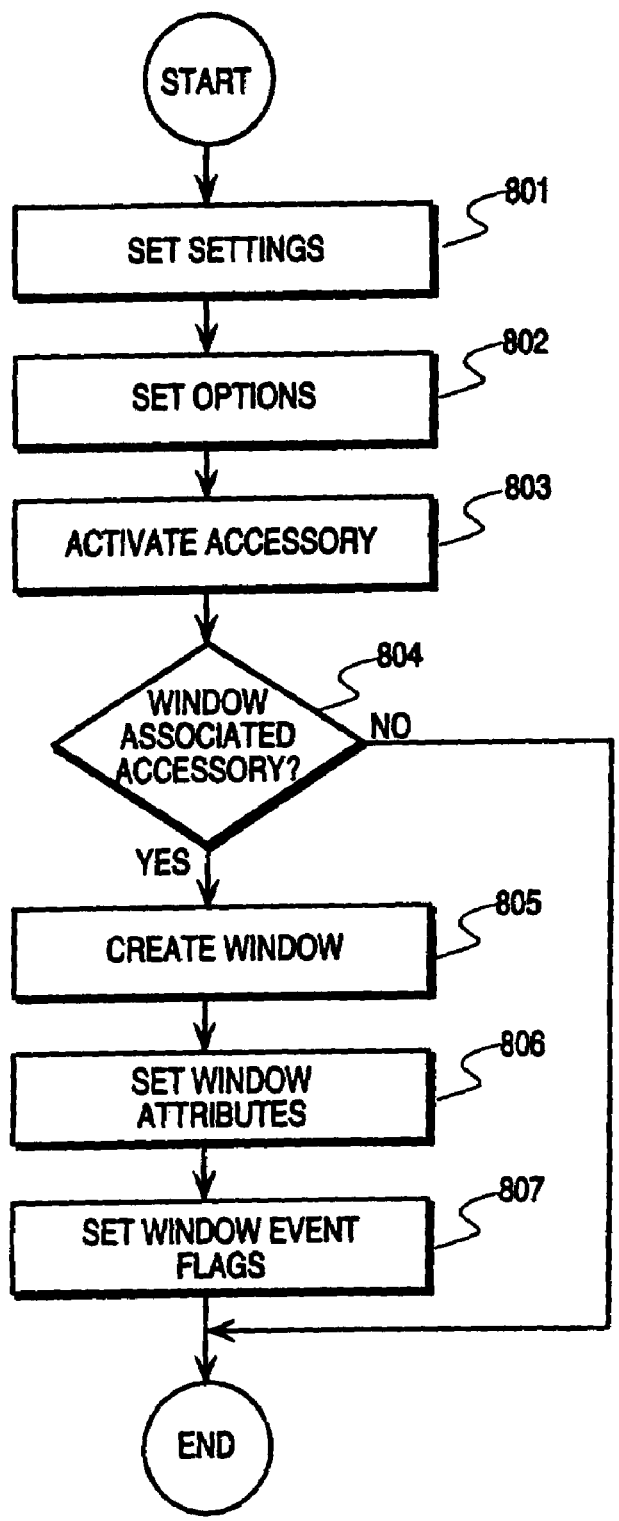
FIG. 8 shows a flowchart of accessory initialization subsequent to being accessorized.

FIG. 8 shows a flowchart of accessory initialization after it has been accessorized. A call to MTConferenceSetOptions at functional block 801 sets both global and accessory specific options. Among the global options are "accessory initially visible" which in the case of a window associated accessory determines whether the window is visible prior to establishing contact and a teleconference. The second option is whether the accessory has a hide box option. A hide box is similar to an application close box which closes the accessory window and removes it from the display. A third option available is a "completely automatic" option which assures that the accessory requires no support from the application. Accessory specific options and additional global options not mentioned above are within the scope and contemplation of the invention. The functional block 802 MTConferenceSetSettings( ) is called to establish the settings for the accessories based on previous save values or defaults. The first time a user uses the application, the setting will be the default, but if the user changes the settings during a conference, they may be saved and used subsequently. A call of MTConferenceGetSettings( ) returns the setting from the conference component and accessory stack as data which the application stores. The application need not and typically does not know the meaning of the data, but merely returns it on a subsequent Set Settings( ) call. The data is passed through the accessory stack with each accessory taking only the portion which defines that accessory's settings. Such settings include user preferences such as, for example, font of typing in a chat window or the color of pen used on the shared whiteboard accessory.

At functional block 803, MTConferenceActivateAccessory( ) is called to activate the accessory. At decision block 804, a determination is made if the activated accessory is associated with a window. If there is a window associated, the accessory then creates a window at functional block 806 having a size and location. Then MTConferenceSetWindowAttributes( ) is called at functional block 805 to establish the attributes including window associate conference, associated member, and owner of the window. Subsequent manipulation of the window results in a setting of the window event flags including a resize flag, a moved flag, a hidden flag, and a disposed flag.

Figure 9:
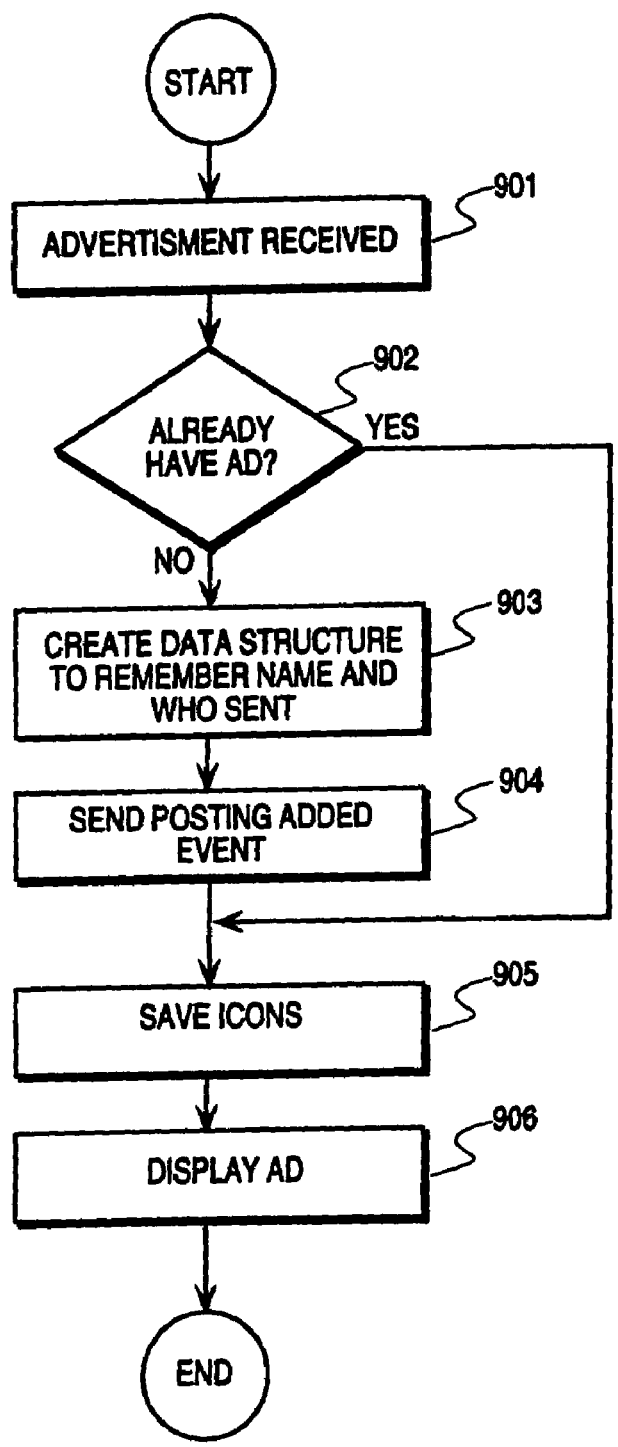
FIG. 9 shows a flowchart of posting to a file sharing accessory window.

FIG. 9 shows a flowchart of posting an advertisement in the filing sharing accessory window. At functional block 901 the advertisement is received. As discussed previously in connection with FIG. 2, this would correspond graphically to one member dragging the icon of a local file to be shared into a file sharing accessory window. At decision block 902 the determination is made whether that file has already been posted. Because it is possible for different members to post advertisements for files having the same name (though a single member can not post two files of the same name) it is necessary to check both the file name and which member is attempting to post the advertisement. If the advertisement has not been previously posted the accessory creates a data structure in which the name of the file and its owner are stored. A PostingAdded event is then sent to the application at functional block 904. The event is purely informational and requires no action by the application. However, it is envisioned that some applications may maintain menus or other status information to which the event may be relevant and in such cases the event may instigate the application to take some action. If at decision block 902 a determination is made that the advertisement already exists or after the PostingAdded event is sent, the icon for the advertisement is saved at functional block 905. The advertisement is displayed in the accessory window at functional block 906 and the routine ends.

Figure 10:
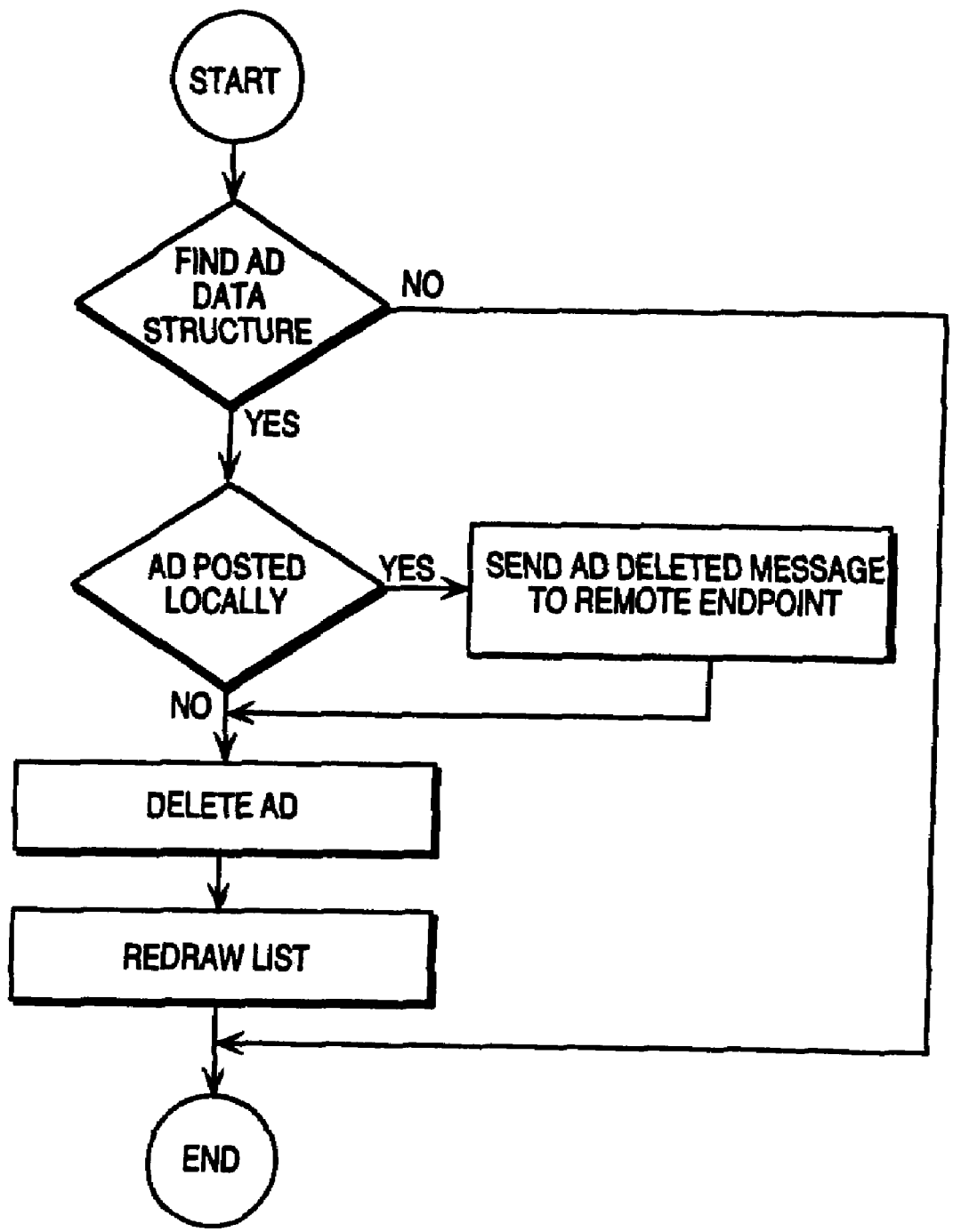
FIG. 10 shows a flowchart of removal of a posting from a file sharing accessory window.

FIG. 10 shows a flowchart of a discontinuation of the sharing of a particular file. This corresponds graphically to dragging the icon of the file to the trash as discussed above in connection with FIG. 2. At decision block 1001 a check is made to find the advertisements data structure based on file name and posting member (corresponding to functional block 903 in FIG. 9). At decision block 1002, it is determined if the advertisement was posted locally. If it was, a delete advertisement message is sent to the remote endpoints. If the advertisement is not locally posted or after sending a delete message, the advertisement is deleted at functional block 100 and the list of advertisements in the window is redrawn at functional block 1005. If the data structure is not found at block 1001 or after the list is redrawn at block 1005, the routine ends.

Figure 11:
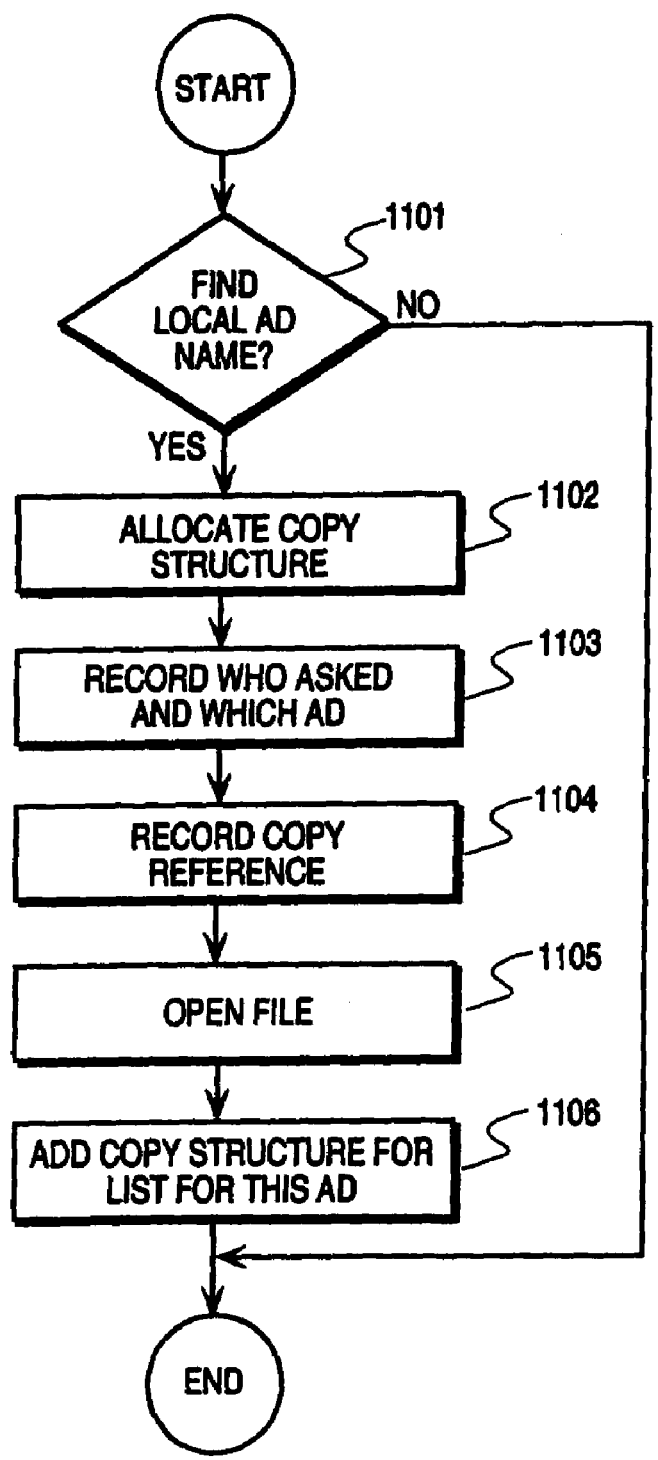
FIG. 11 shows a flowchart of a response to a copy request in a file sharing accessory.

FIG. 11 is a flowchart of the file sharing accessories response to a copy request from a remote end point. At decision block 1101 the accessory identifies whether the copy request is directed to a local advertisement. If the copy request is directed to a local advertisement, the accessory allocates a copy structure at functional block 1102. At functional block 1103, the name of the member who asked for the copy and the corresponding advertisement are recorded into the copy structure. At functional block 1104, a copy reference is also recorded in the copy structure. As the file sharing accessory allows multiple simultaneous copies to be made by a single member, a copy reference is required to specify the particular copy in progress. At functional block 1105, the accessory opens the file corresponding to the advertisement requested. At functional block 1106, the contents of the copy structure is added to the list for the corresponding advertisement. After the copy structure is added or if the accessory fails to find a local advertisement name at decision block 1101 the routine terminates.

Figure 12:
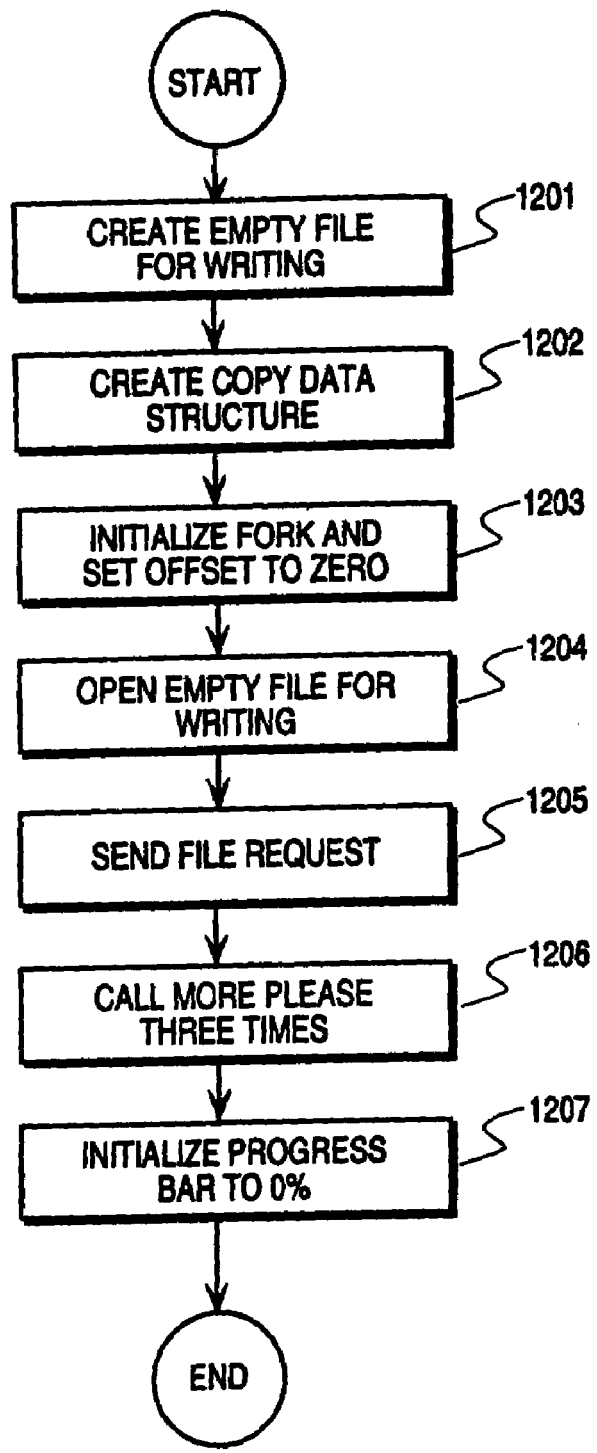
FIG. 12 shows a flowchart of a file sharing accessory initialization prior to copying an advertised file.

FIG. 12 shows a flowchart of the file sharing accessories initialization as it attempts to copy an advertised file. At functional block 1201 an empty file is created for writing the desired file to be copied. The accessory is able to identify from the advertisement the file type, which is used in creating the file for writing. At functional block 1202 the accessory creates a copy structure associated with a copy reference. At functional block 1203 a desired fork is initialized and offset is set to zero. Both the fork type and offset are stored in the copy structure. Files on the Apple Macintosh contain both a resource fork and a data fork. Both forks must be copied for a complete file transfer. At functional block 1204 the accessory opens the empty file previously created at functional block 1201. At functional block 1205, a file request is sent. The file request includes the filename and copy reference. Immediately following the file request, More Please is called three times at functional block 1206. More Please requests a block of data of a specified size. For example, it might request a 4K block. More Please uses size and offset to select the block of data within the file to be copied. By calling More Please consecutively three times, the latency between returns and therefore over all copy time is reduced. For example, if the size is 4K the first call gets 0-4K, the next 4K-8K and the third 8K-12K of the file. The remote end point can immediately begin servicing without waiting for the request or to identify that the whole file has not been received and issue another call. More Please will be discussed more fully in connection with FIGS. 13 and 14 below. At functional block 1207 the progress of the copy bar is initialized to zero percent and the routine ends.

Figure 13:
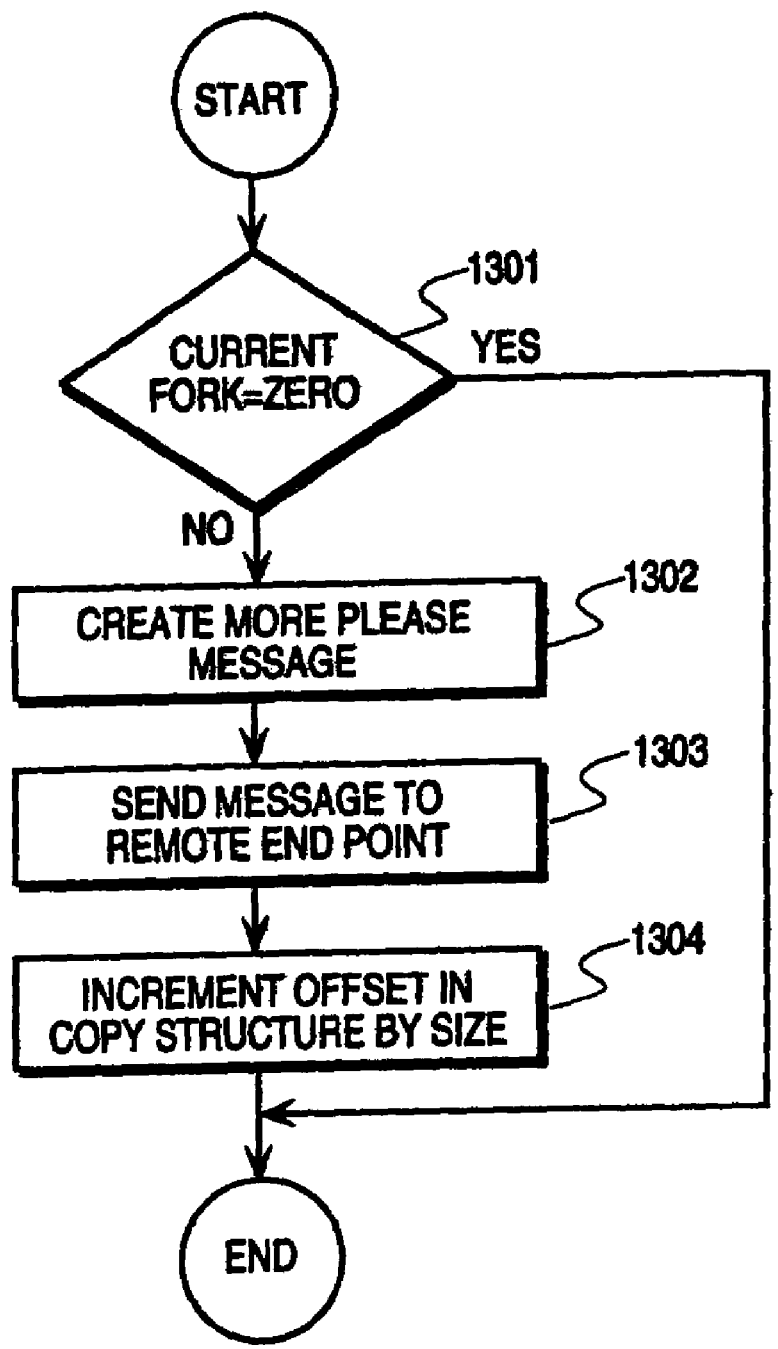
FIG. 13 shows a flowchart of a copier requesting more of a file in a file sharing accessory.

FIG. 13 shows a flowchart of a requesting member's call of More Please. Basically stated in one embodiment, the file is transferred in blocks of a predetermined size as mentioned above, for example 4K. Other embodiments transfer blocks of varying or non-uniform size. Each call of More Please retrieves that number of bytes from the as offset previously initialized and subsequently updated. At decision block 1301 the setting of the fork is checked to determine if it is equal to zero. If the fork is not equal to zero, a More Please message is created at functional block 1302. A More Please message will include the copy reference, the size, offset and fork type. The More Please message is then sent to the remote end point which placed the advertisement for the file to be copied. At functional block 1304 the offset which is stored within the copy structure (created at functional block 1202 of FIG. 12) is incremented by the size of data to be returned, e.g. 4K. If the current fork is zero at decision block 1301 or after the offset is incremented at functional block 1304, the routine terminates.

Figure 14:
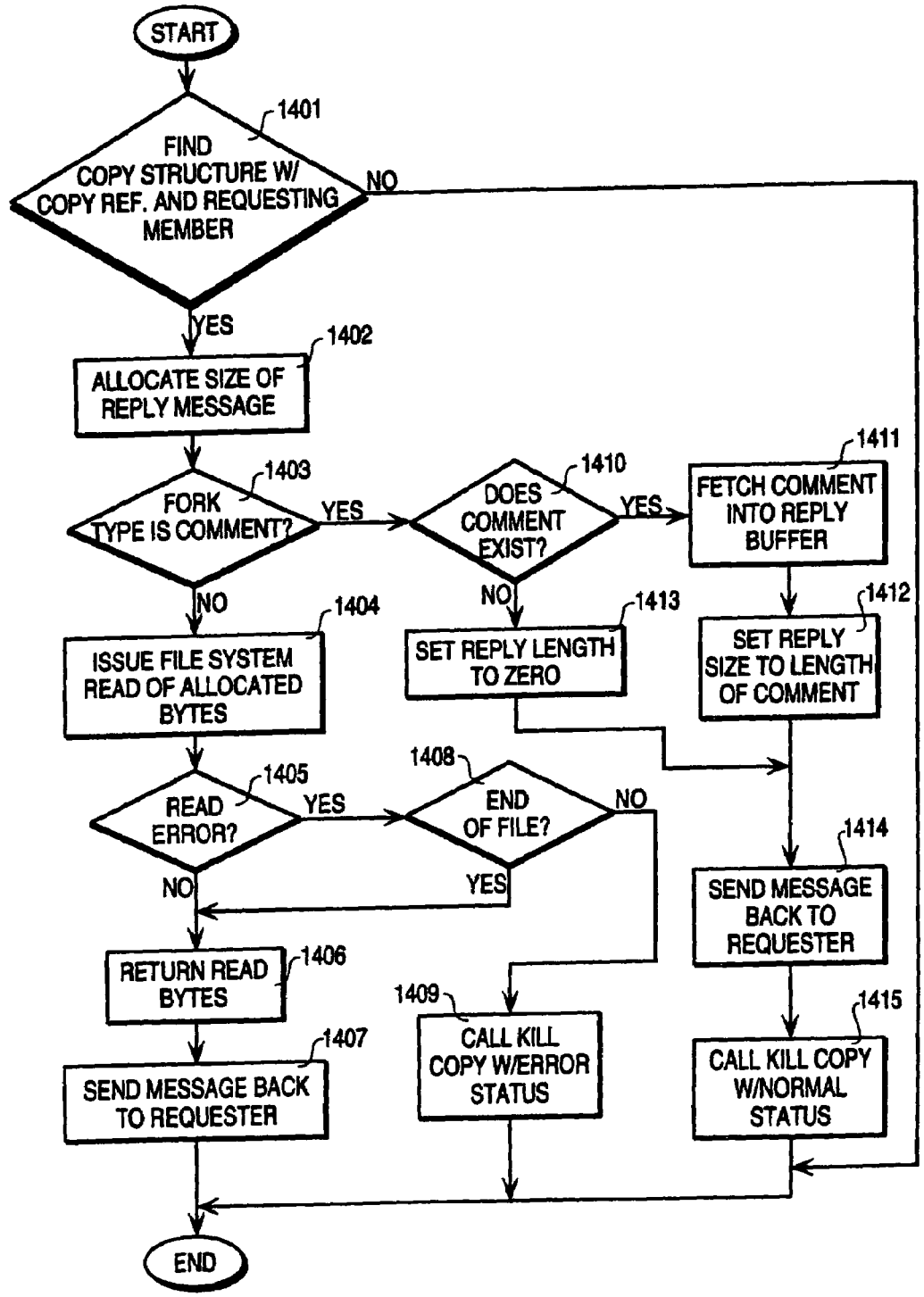
FIG. 14 shows a flowchart of a posting member response to a request for more of a shared file.

FIG. 14 shows a posting member's response to a More Please message. At decision block 1401 the accessory attempts to locate the copy structure with the copy reference and name of the requesting member. If that copy structure is located, the size of the reply message plus a number of bytes for a header is allocated at functional block 1402 in accordance with the request. At decision block 1403, it is determined whether the requested fork type is a comment. If not, at functional block 1404 a file system read of the allocated bytes occurs. At decision block 1405, if no read error has occurred, the read bytes will be returned at functional block 1406. If a read error has occurred, at decision block 1408 a determination is made if the error was caused by an end of file. If the read error was caused by an end of file, the read bytes are still returned in functional block 1406. If the error was not caused by an end of file, kill copy with error status is called at functional block 1409. At functional block 1407 the message containing the read bytes is sent back to the requesting remote end point.

If at decision block 1403, it is determined if the requested fork type is a comment for the advertised file a determination is made at decision block 1410 of whether or not a comment exists. If no comment exists, the reply length is set to zero at functional block 1413. If a comment does exist, the comment is fetched into the reply buffer at 1411 and the reply length is set to the length of the comment at functional block 1412. Then the reply with either zero length or the comment is sent to the requesting end point as a message in functional block 1414. Kill copy with normal status is then called at functional block 1415. If at functional block 1401 the copy structure is not found, or following functional blocks 1407, 1409 or 1415, the routine terminates.

Figure 15:
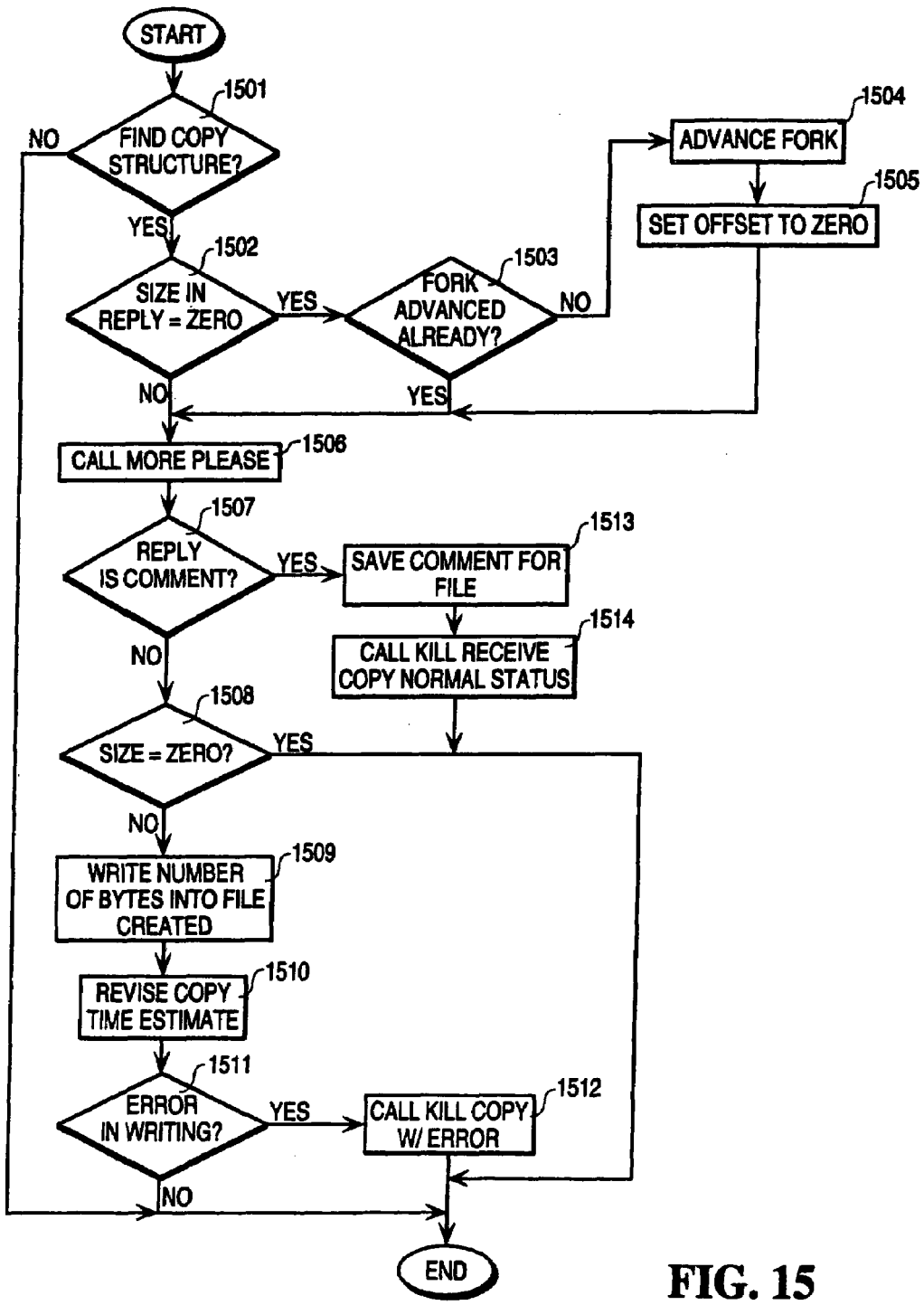
FIG. 15 shows a flowchart of a copier responding to the receipt of a portion of a file being copied.

FIG. 15 shows a flowchart of the routine performed by a recipient message when a DataHere message arrives in response to a More Please having previously been sent. At decision block 1501 the accessory attempts to locate the copy structure. If the copy structure is found, the size of the reply message is checked at decision block 1502. If the size of the reply message is zero, at decision block 1503 a determination is made if the fork has previously been advanced. If the fork has not been previously advanced, the fork is advanced at functional block 1504. The offset is then set to zero at functional block 1505 if the size in the reply is not equal to zero or the fork has already been advanced or after the fork is advanced and the offset is set to zero, More Please is called at functional block 1506. Then at decision block 1507 a determination is made if the returned message is a comment. If the returned message is not a comment, the determination is again made at decision block 1508 to check if the size is zero. If the size is not zero, the number of bytes in the message are written at functional block 1509 to the file previously created (functional block 1201 of FIG. 12). At functional block 1510, the remaining time to copy and the copy bar percentage is revised. Then at decision block 1511 a check is made for errors in writing. If an error in writing occurs, kill copy with error is called at functional block 1512.

If at decision block 1507 it is determined that the reply is a comment, the comment is associated with the file and saved at functional block 1513. At functional block 1514 kill copy with normal status is called. If the copy structure is not found at decision block 1501, no error in writing occurred at decision block 1511, after either kill copy is called, or if size equals zero at decision block 1508 the routine ends.

Figure 16:
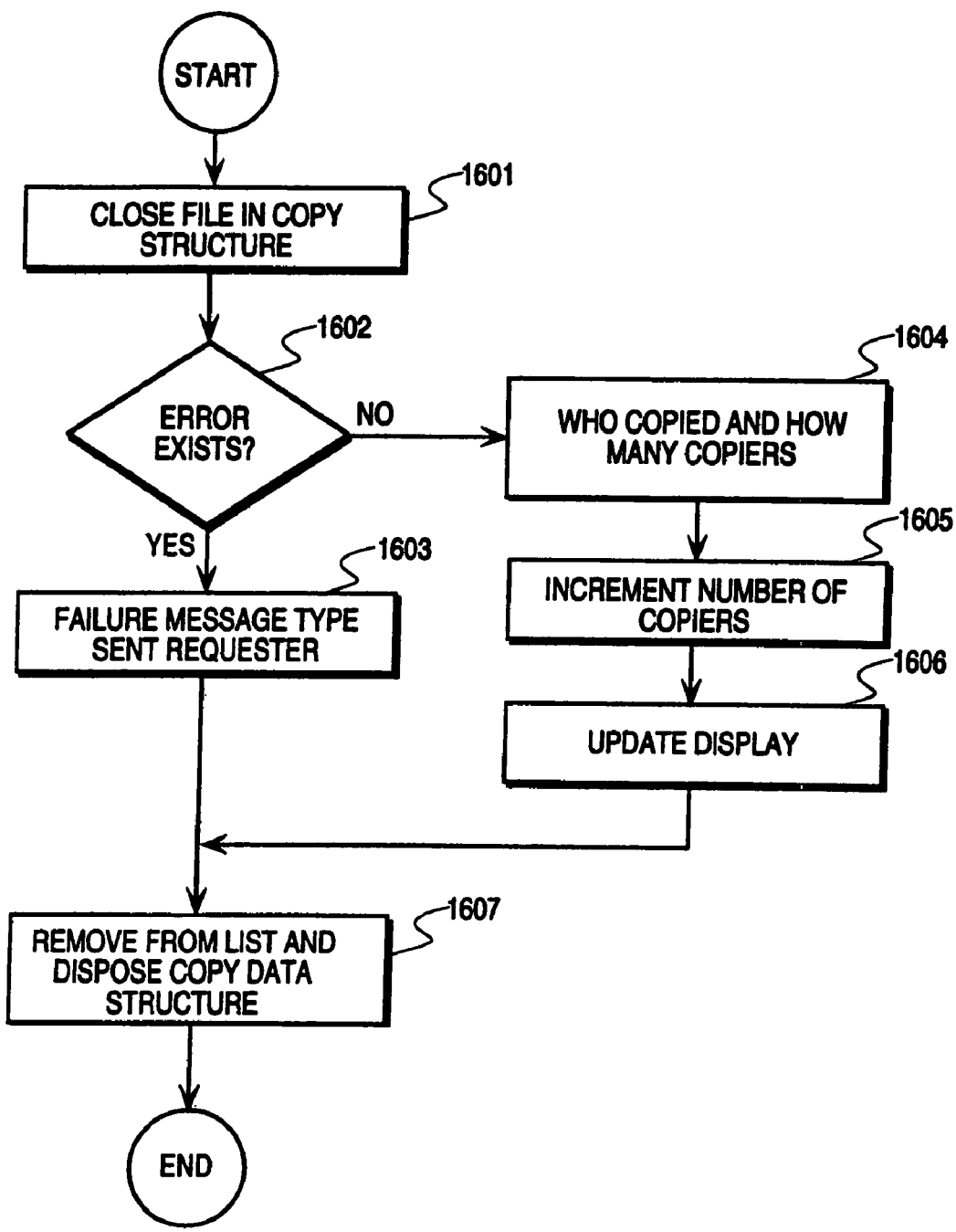
FIG. 16 shows a flowchart of a kill copy routine performed by a posting endpoint.

FIG. 16 shows the kill copy routine employed by the end point which posted advertisement for the file to be shared. At functional block 1601 the accessory closes the file on the copy structure. At decision block 1602 a status check is made to determine if an error caused the kill copy routine to be called. If such error existed, a failure message is sent to requesting end point at functional block 1603. If no error exists, who copied and how many copiers there have been is recorded at functional block 1604. Who copied is important because as members enter and leave the conference, the copy status must be updated based on current membership. If only the number of copiers were tracked, if a new member joined after an old member left, the copy status may reflect copied by everyone even where the new member had not yet copied the file. The number of copiers is incremented at functional block 1605. At functional block 1606 the display is updated so that the advertisement reflects the correct copier information. After the failure message is sent or the display is updated the copied data structure is removed from the list and disposed the routine then terminates.

Figure 17:
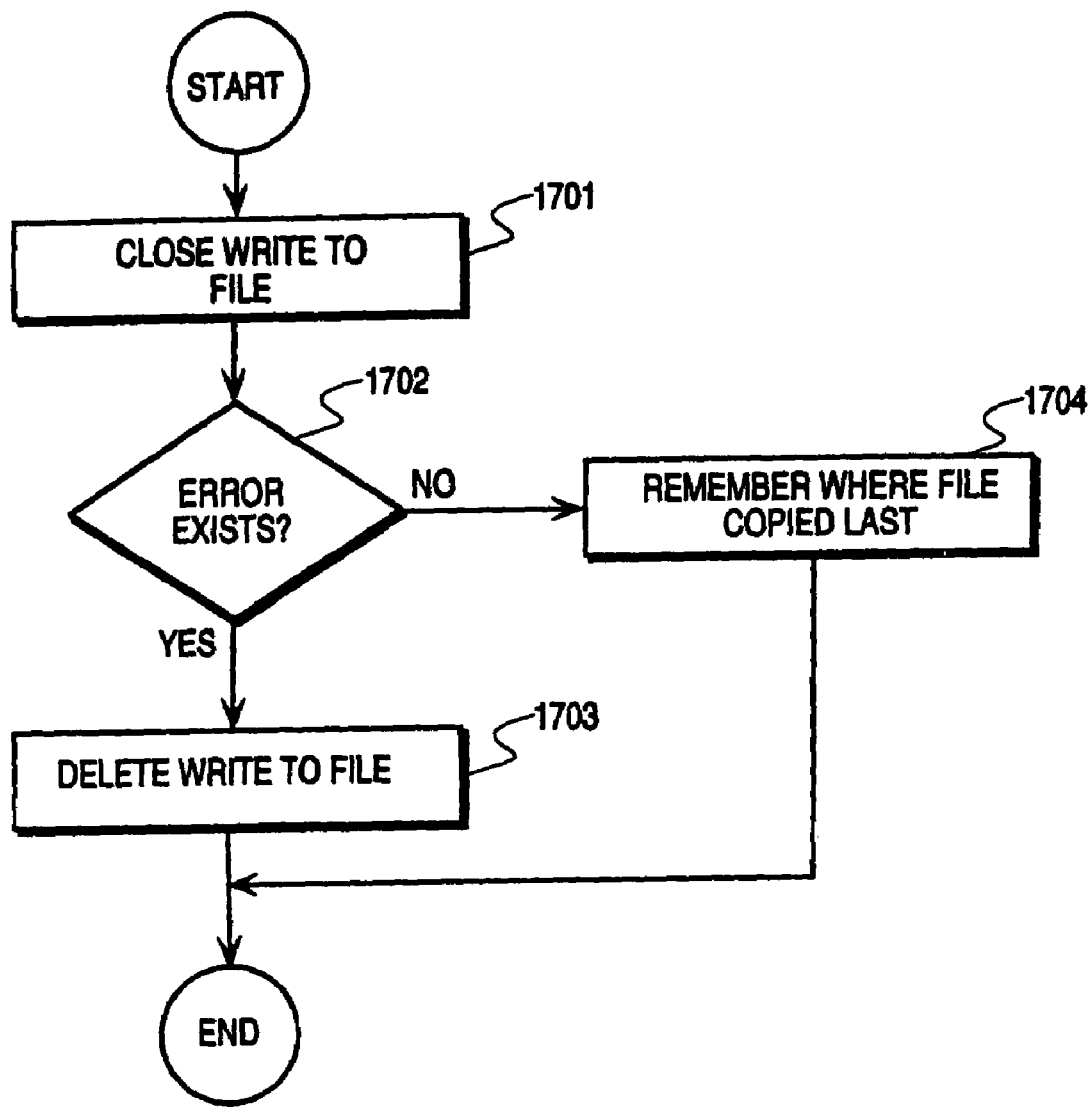
FIG. 17 shows a flowchart of a kill copy routine performed by a copying endpoint.

FIG. 17 is a flowchart of kill copy in a receiving end point. At functional block 1701 the accessory closes the write file. A check is then made at decision block 1702 for errors. If errors exist, the write file is deleted at functional block 1703. If no errors exists, the last location to which the file was copied is stored at functional block 1704. This allows the advertisement to subsequently act as a true alias for the last place to which that particular file was copied. After the file is deleted or the copy location is recorded the routine ends.

Figure 18:
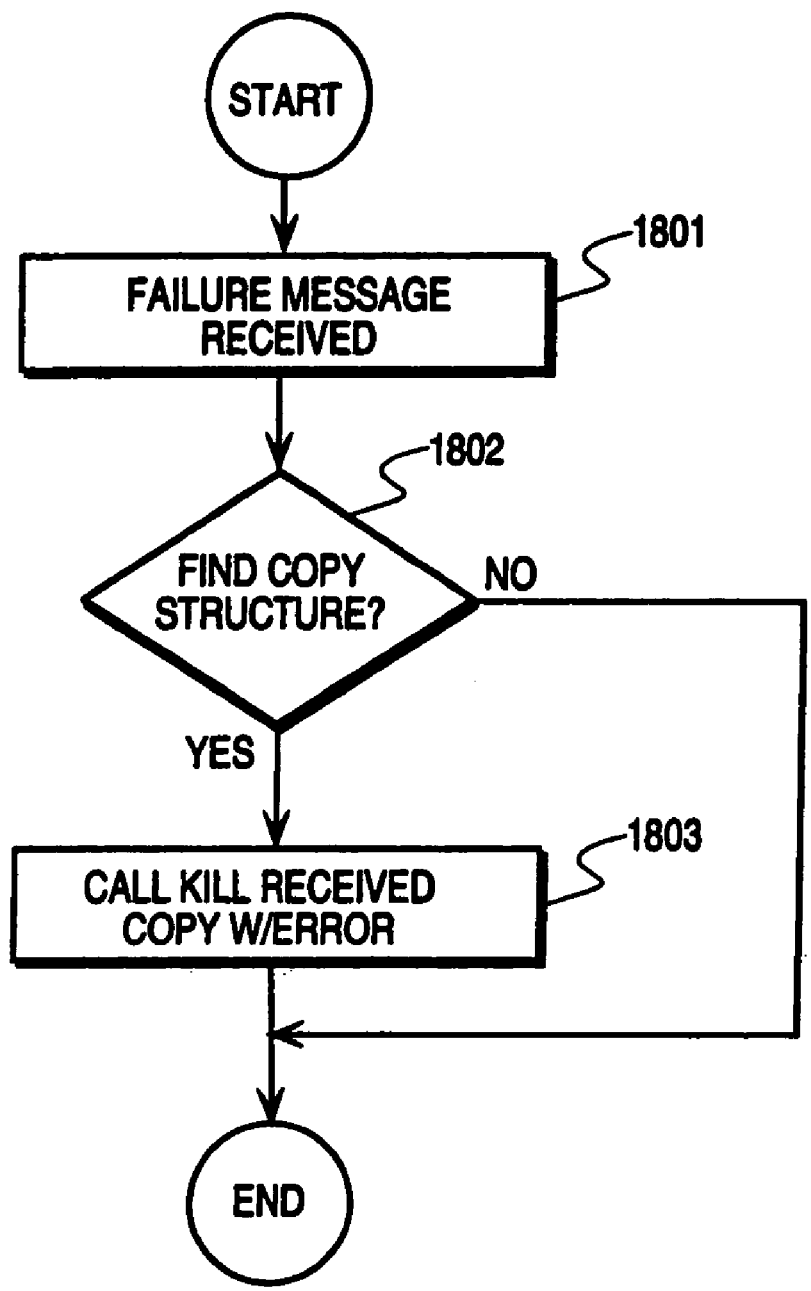
FIG. 18 shows a flowchart of a copying endpoint responding to a failure message.

FIG. 18 the routine of a receiving end point in response to a failure message. At functional block 1801, the accessory receives a failure message. At decision block 1802 the accessory attempts to locate the copy structure corresponding to the failure message. If the copy structure is found, the accessory calls kill copy with error at functional block 1803. If no copy is found or after kill copy is called, the routine ends.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method for providing access to a remotely stored file, the method comprising:
   establishing a communication channel for exchanging near real-time messages in an application for the near real-time messages between a local device and a remote device over a network;
   listening to the communication channel to detect the near real-time messages; and
   displaying in a file sharing window on the local device a representation of a file stored in the remote device, the file sharing window being associated with the near rear-time messaging application and the file sharing window enabling the local device to access the file stored in the remote device via the communication channel for exchanging the near real-time messages.

2. The method of claim 1, wherein the application for the near real-time messages is a near real-time chatting application.

3. The method of claim 2, wherein the file sharing window is part of user interface of the near real-time chatting application that allows the local device to exchange near real-time chatting content with the remote device during a near real-time chatting session.

4. The method of claim 1, further comprising opening the file at the local device in response to activation from a user on the representation within the file sharing window.

5. The method of claim 1, further comprising:
   copying the file from the remote device to the local device to create a copied file when a user attempts to open the file from the file sharing window; and
   changing the representation of the file in the file sharing window into an alias of the copied file to allow the copied file to he directly opened from the local device via the alias in the file sharing window.

6. The method of claim 1, wherein the representation of the file is displayed when a user of the remote device posts the file in a remote file sharing window of the remote device.

7. The method of claim 6, wherein the file is posted by dragging and dropping the representation of the file into the remote file sharing window of the remote device.

8. A machine-readable medium having instructions stored therein, which when executed by a machine, cause the machine to perform a method for providing access to a remotely stored file, the method comprising:
   establishing a communication channel for exchanging near real-time messages in an application for the near real-time messages between a local device and a remote device over a network;
   listening to the communication channel to detect the near real-time messages; and
   displaying in a file sharing window on the local device a representation of a file stored in the remote device, the file sharing window being associated with the near real-time messaging application and the file sharing window enabling the local device to access the file stored in the remote device via the communication channel for exchanging the near real-time messages.

9. The machine-readable medium of claim 8, wherein the application for the near real-time messages is a near real-time chatting application.

10. The machine-readable medium of claim 8, wherein the file sharing window is part of user interface of the near real-time chatting application that allows the local device to exchange near real-time chatting content with the remote device during a near real-time chatting session.

11. The machine-readable medium of claim 8, wherein the method further comprises opening the file at the local device in response to activation from a user on the representation within the file sharing window.

12. The machine-readable medium of claim 8, wherein the method further comprises:
copying the file from the remote device to the local device to create a copied file when a user attempts to open the file from the file sharing window; and
changing the representation of the file in the file sharing window into an alias of the copied file to allow the copied file to be directly opened from the local device via the alias in the file sharing window.

13. The machine-readable medium of claim 8, wherein the representation of the file is displayed when a user of the remote device posts the file in a remote file sharing window of the remote device.

14. The machine-readable medium of claim 13, wherein the file is posted by dragging and dropping the representation of the file into the remote file sharing window of the remote device.

15. An apparatus for providing access to a remotely stored file, the apparatus comprising:
a network component to establish a communication channel for exchanging near real-time messages in an application for near real-time messages between a local device and a remote device over a network;
a listening component to listen to the communication channel to detect the near real-time messages; and
a conference component coupled to the network component to display in a file sharing window on the local device a representation of a file stored in the remote device, the file sharing window being associated with the near real-time messaging application and the file sharing window enabling the local device to access the file stored in the remote device via the communication channel for exchanging the near real-time messages.

16. A data processing system, comprising:
a processor; and
a memory coupled to the processor for storing instructions, which when executed by the processor, cause the processor to
establish a communication channel for exchanging near real-time messages in an application for the near real-time messages between a local device and a remote device over a network,
listen to the communication channel to detect the near real-time messages, and
display in a file sharing window on the local device a representation of a file stored in the remote device, the file sharing window being associated with the near real-time messaging application and the file sharing window enabling the local device to access the file stored in the remote device via the communication channel for exchanging the near real-time messages.

17. An apparatus for providing access to a remotely stored file, the apparatus comprising:
means for establishing a communication channel for exchanging near real-time messages in an application for the near real-time messages between a local device and a remote device over a network;
means for listening to the communication channel to detect the near real-time messages; and
means for displaying in a file sharing window on the local device a representation of a file stored in the remote device, the file sharing window being associated with the near real-time messaging application and the file sharing window enabling the local device to access the file stored in the remote device via the communication channel for exchanging the near real-time messages.

18. A method for providing access to a locally stored file, the method comprising:
establishing a communication channel for exchanging near real-time messages in an application for the near real-time messages between a local device and a remote device over a network;
listing to the communication channel to detect the near real-time messages; and
posting in a file sharing window on the local device a representation of a file stored in the local device, the file sharing window being associated with the near real-time messaging application and the file sharing window enabling the remote device to access the file stored in the local device via the communication channel for exchanging the near real-time messages.

19. The method of claim 18, wherein the application for the near real-time messages is a near real-time chatting application.

20. The method of claim 19, wherein the file sharing window is part of user interface of the near real-time chatting application that allows the local device to exchange near real-time chatting content with the remote device during a near real-time chatting session.

21. The method of claim 18, further comprising the remote device opening the file at the remote device in response to activation from a user on the representation displayed within the file sharing window of the remote device.

22. The method of claim 18, further comprising:
copying the file from the local device to the remote device to create a copied file when a user of the remote device attempts to open the file from the file sharing window of the remote device; and
changing the representation of the file in the file sharing window into an alias of the copied file to allow the copied file to be directly opened from the remote device via the alias in the file sharing window.

23. The method of claim 18, wherein the file is posted by dragging and dropping the representation of the file into the file sharing window of the local device.

24. A machine-readable medium having instructions stored therein, which when executed by a machine, cause the machine to perform a method for providing access to a locally stored file, the method comprising:
establishing a communication channel for exchanging near real-time messages in an application for the near real-time messages between a local device and a remote device over a network;
listening to the communication channel to detect the near real-time messages; and
posting in a file sharing window on the local device a representation of a file stored in the local device, the file sharing window being associated with the near real-time messaging application and the file sharing window enabling the remote device to access the file stored in the local device via the communication channel for exchanging the near real-time messages.

25. The machine-readable medium of claim 24, wherein the application for the near real-time messages is a near real-time chatting application.

26. The machine-readable medium of claim 25, wherein the file sharing window is part of user interface of the near real-time chatting application that allows the local device to exchange near real-time chatting content with the remote device during a near real-time chatting session.

27. The machine-readable medium of claim 24, wherein the method further comprises the remote device opening the file at the remote device in response to activation from a user on the representation displayed within the file sharing window of the remote device.

28. The machine-readable medium of claim 24, wherein the method further comprises:
   copying the file from the local device to the remote device to create a copied file when a user of the remote device attempts to open the file from the file sharing window of the remote device; and
   changing the representation of the file in the file sharing window into an alias of the copied file to allow the copied file to be directly opened from the remote device via the alias in the file sharing window.

29. The machine-readable medium of claim 24, wherein the file is posted by dragging and dropping the representation of the file into the file sharing window of the local device.

30. An apparatus for providing access to a locally stored file, the apparatus comprising:
   a network component to establish a communication channel for exchanging near real-time messages in an application for the near real-time messages between a local device and a remote device over a network;
   a listening component to listen to the communication channel to detect the near real-time messages; and
   a conference component to post in a file sharing window on the local device a representation of a file stored in the local device, the file sharing window being associated with the near real-time messaging application and the file sharing window enabling the remote device to access the file stored in the local device via the communication channel for exchanging the near real-time messages.

31. A data processing system, comprising:
   a processor; and
   a memory coupled to the processor for storing instructions, which when executed by the processor, cause the processor to
      establish a communication channel for exchanging near real-time messages in an application for the near real-time messages between a local device and a remote device over a network,
      listen to the communication channel to detect the near real-time messages, and
      post in a file sharing window on the local device a representation of a file stored in the local device, the file sharing window being associated with the near real-time messaging application and the file sharing window enabling the remote device to access the file stored in the local device via the communication channel for exchanging the near real-time messages.

32. An apparatus for providing access to a remotely stored file, the apparatus comprising:
   means for establishing a communication channel for exchanging near real-time messages in an application for near real-time messages between a local device and a remote device over a network;
   means for listening to the communication channel to detect the near real-time messages; and
   means for posting in a file sharing window on the local device a representation of a file stored in the local device, the file sharing window being associated with the near real-time messaging application and the file sharing window enabling the remote device to access the file stored in the local device via the communication channel for exchanging the near real-time messages.

33. A method for providing access to a remotely stored file, the method comprising:
   displaying in a chat window on a local endpoint a representation of a file stored in a remote endpoint, the chat window being associated with a near real-time chatting application; and
   accessing from the local endpoint via the representation displayed in the chat window the file stored in the remote endpoint, the file being sent via a communication channel established for exchanging chatting messages for the near real-time chatting application, wherein the exchange of the chatting messages includes listening to the communication channel.

34. The method of claim 33, wherein the chat window is part of user interface of the near real-time chatting application that allows the local endpoint to exchange the chatting messages with the remote endpoint during a near real-time chatting session.

35. The method of claim 33, further comprising opening the file at the local endpoint in response to activation from a user on the representation within the chat window.

36. A method for providing access to a locally stored file, the method comprising:
   posting a file in a chat window on a local endpoint, the file being locally stored in the local endpoint and the chat window being associated with a near real-time chatting application; and
   allowing access the posted file from a remote endpoint via a representation displayed in a chat window of the remote endpoint, the posted file being sent via a communication channel established for exchanging chatting messages for the near real-time chatting application, wherein the exchange of the chatting messages includes listening to the communication channel.

37. The method of claim 36, wherein the chat window is part of user interface of the near real-time chatting application that allows the local endpoint to exchange the chatting messages with the remote endpoint during a near real-time chatting session.

38. The method of claim 36, further comprising opening the file at the remote endpoint in response to activation from a user on the representation displayed within the remote chat window.

* * * * *